USO08918835B2

(12) United States Patent
Ravindran et al.

(10) Patent No.: US 8,918,835 B2
(45) Date of Patent: Dec. 23, 2014

(54) METHOD AND APPARATUS TO CREATE AND MANAGE VIRTUAL PRIVATE GROUPS IN A CONTENT ORIENTED NETWORK

(75) Inventors: Ravishankar Ravindran, San Jose, CA (US); Guo-Qiang Wang, Santa Clara, CA (US); Gangyu Shi, Cupertino, CA (US)

(73) Assignee: Futurewei Technologies, Inc., Plano, TX (US)

( * ) Notice: Subject to any disclaimer, the term of this patent is extended or adjusted under 35 U.S.C. 154(b) by 152 days.

(21) Appl. No.: 13/237,119

(22) Filed: Sep. 20, 2011

(65) Prior Publication Data

US 2012/0159176 A1   Jun. 21, 2012

Related U.S. Application Data

(60) Provisional application No. 61/423,947, filed on Dec. 16, 2010.

(51) Int. Cl.
G06F 17/00 (2006.01)
H04L 29/06 (2006.01)
H04L 29/08 (2006.01)

(52) U.S. Cl.
CPC .......... H04L 63/104 (2013.01); H04L 63/0428 (2013.01); H04L 63/12 (2013.01); H04L 67/327 (2013.01); H04L 63/105 (2013.01)
USPC ............................ 726/1; 726/2; 726/3; 726/4

(58) Field of Classification Search
CPC ... H04L 63/104; H04L 67/327; H04L 63/105; H04L 63/12; H04L 63/0428
USPC .................................. 726/1–6, 11–15, 27–30
See application file for complete search history.

(56) References Cited

U.S. PATENT DOCUMENTS

| 6,173,399 | B1 * | 1/2001 | Gilbrech | 713/153 |
|---|---|---|---|---|
| 6,931,529 | B2 * | 8/2005 | Kunzinger | 713/153 |
| 7,362,752 | B1 * | 4/2008 | Kastenholz | 370/389 |
| 7,835,348 | B2 * | 11/2010 | Kasralikar | 370/360 |
| 7,849,199 | B2 | 12/2010 | Schultz et al. | |

(Continued)

FOREIGN PATENT DOCUMENTS

| CN | 101317416 A | 12/2008 |
|---|---|---|
| CN | 102143199 A | 8/2011 |

(Continued)

OTHER PUBLICATIONS

Jacobson, et al., Networking Named content, Dec. 1-4, 2009, ACM.*

(Continued)

Primary Examiner — Kambiz Zand
Assistant Examiner — Jing Sims
(74) Attorney, Agent, or Firm — Conley Rose, P.C.; Grant Rodolph; Brandt D. Howell

(57) ABSTRACT

A content router for managing content for virtual private groups in a content oriented network, the content router comprising storage configured to cache a content from a customer in a content oriented network (CON), and a transmitter coupled to the storage and configured to forward the content upon request, wherein the content is signed by the user, wherein the CON provides different security levels for different users in a plurality of users, and wherein the plurality of users correspond to a plurality of user classes.

22 Claims, 16 Drawing Sheets

(56) References Cited

U.S. PATENT DOCUMENTS

| | | | |
|---|---|---|---|
| 8,301,882 B2* | 10/2012 | Smith | 713/160 |
| 2004/0064714 A1* | 4/2004 | Carr | 713/193 |
| 2004/0083382 A1* | 4/2004 | Markham et al. | 713/200 |
| 2005/0213768 A1* | 9/2005 | Durham et al. | 380/278 |
| 2006/0112425 A1* | 5/2006 | Smith et al. | 726/13 |
| 2006/0224764 A1* | 10/2006 | Shinohara et al. | 709/232 |
| 2006/0259583 A1* | 11/2006 | Matsuura | 709/218 |
| 2007/0014278 A1 | 1/2007 | Ebbesen et al. | |
| 2007/0214497 A1* | 9/2007 | Montgomery et al. | 726/4 |
| 2007/0242827 A1 | 10/2007 | Prafullchandra et al. | |
| 2007/0271592 A1* | 11/2007 | Noda et al. | 726/1 |
| 2008/0008085 A1* | 1/2008 | Gerstel | 370/216 |
| 2008/0072033 A1* | 3/2008 | McAlister | 713/153 |
| 2008/0098212 A1* | 4/2008 | Helms et al. | 713/155 |
| 2008/0127354 A1* | 5/2008 | Carpenter et al. | 726/28 |
| 2008/0222695 A1* | 9/2008 | Itkis | 726/1 |
| 2008/0307110 A1 | 12/2008 | Wainner et al. | |
| 2011/0072084 A1* | 3/2011 | Kiyohara | 709/204 |
| 2012/0008528 A1* | 1/2012 | Dunbar et al. | 370/255 |

FOREIGN PATENT DOCUMENTS

| | | | |
|---|---|---|---|
| EP | 2120402 A1 | 11/2009 | |
| WO | 2009113921 A1 | 11/2009 | |
| WO | 2012103818 A1 | 8/2012 | |

OTHER PUBLICATIONS

Arianfa, et al., On Content-Centric Router Design and Implications, Nov. 30, 2010, ACM.*

Arianfar, et al., Packet-level Caching for Information-centric Networking, Jun. 4, 2010.*

Foreign Communication From a Counterpart Application, European Application No. 11848563.0, Extended European Search Report dated Dec. 3, 2013, 10 pages.

Jacobson, V., et al., "Networking Named Content," Conext '09, Proceedings of the 5th International Conference on Emerging Networks Experiments and Technologies, Association For Computing Machinery, Dec. 1, 2009, XP002608160, 12 pages.

Zhang, L., et al., "Named Data Networking (NDN) Project," NDN-0001, Internet Citation, XP002687393, Oct. 31, 2010, 13 pages.

Foreign Communication From A Counterpart Application, PCT Application No. PCT/CN2011/083625, International Search Report dated Mar. 15, 2012, 3 pages.

Foreign Communication From A Counterpart Application, PCT Application No. PCT/CN2011/083625, Written Opinion dated Mar. 15, 2012, 4 pages.

* cited by examiner

METHOD AND APPARATUS TO CREATE AND MANAGE VIRTUAL PRIVATE GROUPS IN A CONTENT ORIENTED NETWORK

CROSS-REFERENCE TO RELATED APPLICATIONS

The present application claims the benefit of U.S. Provisional Patent Application No. 61/423,947 filed Dec. 16, 2010 by Ravi Ravindran et al. and entitled "Method and Apparatus to Create and Manage Virtual Private Groups in a Content Oriented Network," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In a content-oriented network (CON) or information-centric network (ICN), a content router is responsible for routing user requests and content to proper recipients. In the CON, a domain-wide unique name is assigned to each entity that is part of a content delivery framework. The entities may comprise data content, such as video clips or web pages, and/or infrastructure elements, such as routers, switches, or servers. The content router uses name prefixes, which can be full content names or proper prefixes of content names instead of network addresses, to route content packets within the content network. In CONs, content delivery including publishing, requesting, managing (e.g., modification, deletion, etc.) may be based on content name and not content location. One aspect of CONs that may be different from traditional Internet Protocol (IP) networks is the ability of CONs to interconnect multiple geographical points and cache content temporarily or store content on a more persistent basis. This may allow content to be served from the network instead of an original server, and thus may substantially improve user experience. The caching/storing may be used for real time data that is fetched by the user or for persistent data that belongs to the user or to a content provider, e.g., a third party provider.

SUMMARY

In one embodiment, the disclosure includes a content router for managing content for virtual private groups in a content oriented network, the content router comprising storage configured to cache a content from a customer in a content oriented network (CON), and a transmitter coupled to the storage and configured to forward the content upon request, wherein the content is signed by the user, wherein the CON provides different security levels for different users in a plurality of users, and wherein the plurality of users correspond to a plurality of user classes.

In another embodiment, the disclosure includes a content oriented network (CON) system comprising a cache configured to receive a signed content from one of a plurality of Virtual Private Groups (VPGs), cache the signed content, and forward the cached signed content upon request, a first component coupled to the cache and configured to receive the signed content from a publisher and send the signed content to the cache, and a second content coupled to the cache and configured to receive the signed content from the cache and send the signed content to a subscriber that verifies the signed content, wherein the CON provides different security levels for different one of the plurality of VPGs.

In a third aspect, the disclosure includes a network apparatus implemented method comprising receiving at a receiver first content from a first publisher and second content from second publisher, wherein the first content has been signed using a signature of the first publisher, and wherein the second content has been signed using a signature of the second publisher, encrypting with a processor the first and second content, storing the first and second content in a content oriented network (CON), and enforcing a first security policy for the first content and enforcing a second security policy for the second content, wherein the first security policy is different from the second security policy.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
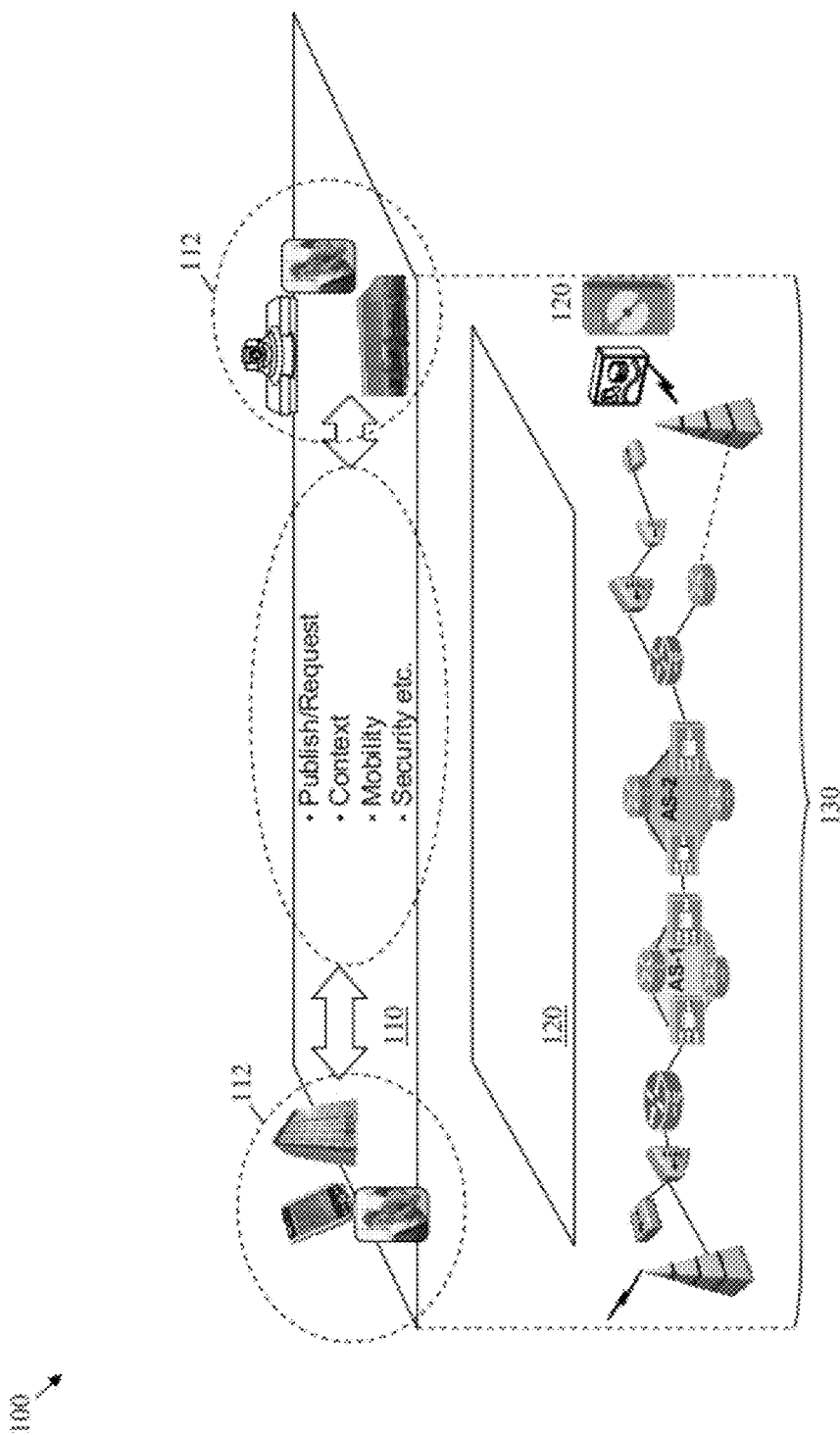
FIG. 1 is a schematic diagram of an embodiment of a CON architecture.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The caching/storing feature of a CON may have several implications to the user in terms of management, performance, security, and reliability of handled data. The implications may depend on the service level agreements (SLAs) between the CON and the user. In some scenarios, the user may entrust the CON to manage all its data. In other scenarios, the CON may only provide a best effort service, such as giving priority to the preferred user, during the content dissemination process. There may be a need to provide differential treatment to users using a CON as different users may have different requirements, e.g., in terms of content dissemination requirements in terms performance, reliability and security.

Disclosed herein are systems and methods for serving different users or user groups that may have different preferences and requirements. A group of users (mostly affiliated to a common entity, may have grouped in an ad hoc manner) and that may have a common set of preferences in terms of the requirements for how its content is to be managed by the CON SP is referred to herein as a VPG (We use the term VPG as a more general term instead of VPN, as traditionally VPN has been used to indicate an Enterprise instance over a shared infrastructure. In our context VPG could be a VPN or any group of users/entities trying to achieve a common objective). The group may be virtual in the sense that the members of the group may be geographically dispersed and logically overlaid over a CON infrastructure. The group may also be private in the sense that the CON may allow the group to preserve VPG attributes (in terms of content being disseminated) similar to the case if the content dissemination is managed by the VPG themselves. A VPG may be any set of users that are bound by common properties on aspects related to membership, resource (e.g., informational resource and network facility resource), performance, security, reliability, or combinations thereof. For example, a VPG may be an Enterprise, a content creator/distributor (e.g., Netflix, Hulu, etc.), or an online retailer (Amazon, Walmart, etc.) with facilities that may be geographically distributed and whose SLA requirements may be stringent with respect to performance, security, and/or reliability. Alternatively, the VPG may be a form of a social network (e.g., Facebook, Youtube, etc.), which may bind users by their common interests.

Based on the systems and methods, the CON may support security issues for VPG users, such as privacy and confidentiality of shared data and associated network resource. Additionally, each VPG may have corresponding application requirements, e.g., to improve content dissemination among the VPG's users. Such application layer support may be extended in the CON to each VPG. The CON may be based on a framework, e.g., a infrastructure, that allows VPGs of different requirements to coexist on the CON. The framework may allow the CON to formulate specific policies for each of the VPGs, offer customized treatment and realize the policies using building blocks to support VPGs in the CON. The framework may span various elements of the content plane and other planes in the CON to allow VPG creation and operation, as described in detail below.

FIG. 1 illustrates an embodiment of a CON architecture 100, where content objects is uniquely identified by it ID and delivered to customers based on request for it. The CON architecture 100 may comprise a plurality of customer nodes/sites 112 that may publish (push) and/or subscribe or request (pull) content in a CON 110. The customer nodes/sites 112 may correspond to users and/or user applications. The users may be publishers, subscribers, Enterprises (e.g., Healthcare, Financial, Insurance, Movie studios, etc.), Social Networks, Governments, First Responder networks, Sensor Networks, Data Transmission Networks, Mobile-to-Mobile (M2M) networks, other content user types, or combinations thereof.

The customer nodes/sites 112 may be nodes, devices, or components configured to deliver content to and receive content requests from the users or user applications. For instance, the customer nodes may be fixed or mobile user-oriented devices, such as desktop computers, notebook computers, personal digital assistants (PDAs), or cellular telephones. Alternatively, the customer nodes may be connectivity devices at customer premises, such as modems or set-top boxes. The customer nodes may also comprise customer equipment (not shown) that may be configured to receive content from the CON 110, e.g., via access networks, and distribute the content to a plurality of customers 112. For instance, the customer nodes may comprise optical network terminals (ONUs) and/or very high bit rate Digital Subscriber Line (VDSL) transceiver units at residential locations (VTU-Rs). The access networks may be any networks that provide access to the content in the CON 110, such as Virtual Private Networks (VPNs).

The CON 110 may provide a plurality of services to the customer nodes/sites 112, including content publishing/subscribing or requesting, content cashing/storing, customer mobility support, security, and/or other content oriented services. The CON 110 may also be referred to herein as an Information Centric Network (ICN). The CON 110 may comprise a plurality of network nodes 130, which may be coupled to each other via network links, e.g., fixed connections. The network nodes 130 may be any nodes, devices, or components that support transportation of traffic, e.g., frames and/or packets, through the CON 110. The network nodes 130 may pass the traffic onto or receive the traffic from other nodes in the CON 110. The network nodes 130 may comprise a plurality of content servers that store or cache content, which may be provided to users or subscribers, e.g., upon demand. For example, the network nodes 130 may be routers, switches, or bridges, such as backbone core bridges (BCBs), provider core bridges (PCBs), or label switch routers (LSRs).

Additionally, the network nodes 130 may comprise content routers that forward content based on content name prefixes. The content routers may be configured to route, cache, and/or store content. Some of the content routers, e.g., edge nodes, may be coupled to the customer nodes/sites 112, e.g., via a plurality of access networks, wired links, or wireless links. The content routers may be edge nodes and possibly core nodes in the CON 110 that forward content traffic to the customer nodes/sites 112 based on a customer request or demand. The content routers may also receive content requests from the customer nodes/sites 112. For example, the content routers are enhanced versions of traditional routers or bridges, such as backbone edge bridges (BEBs), provider edge bridges (PEBs), or label edge routers (LERs) that forward content based on content name prefixes, from a transport perspective the roles of these nodes could be the same (even for backward compatibility), but more importantly they are enabled for content distribution through features like dynamic/persistent caching, and application level assistance. These content routers could also be fully functional CCN routers or content routers based on other proposals, in which case the goal of content dissemination is ingrained in the transportation layer. The network could be a combination of these pure content routers, traditional router/switches or a combination thereof considering the case of deployment of these futuristic technologies.

In the CON architecture 100, the CON 110 may have a CON plane infrastructure 120 that handles providing different services to the customer nodes/sites 112. The CON plane infrastructure 120 comprise a plurality of operation planes that support the different services for the customer nodes/sites 112. For instance, the CON plane infrastructure 120 comprise a management plane, a storage and computing plane, a control plane, a content plane (also referred to as content data plane), a transport plane. The different planes may handle different aspects of the CON operations and resources related to content, services, and customer nodes/sites 112, such as management, storage, control, and transport. Typically, each of the planes may treat the customer nodes/sites 112 and their corresponding content and support the services for the different customer nodes/sites 112, e.g., in terms of performance, security, and reliability, substantially in a similar or flat manner. However, the customer nodes/sites 112 may belong to different groups, e.g., different VPGs, which may have different requirements (e.g., Quality of Service (QoS) requirements), SLAs, and/or other policies. Typically, the flat plane behavior of the planes in the CON plane infrastructure 120 does not consider the different requirements of the VPGs, which may cause reduced network efficiency and waste of network resources. For example, disseminating content for different VPGs that have different SLAs in a similar manner may prevent effective load balancing in the CON 110.

In an embodiment, the CON 110 may be an ICN, where the cached content may have one or more owners that may be associated with one or more customer nodes/sites 112. The owners may rely on the ICN service provider (SP) to deliver the content to authorized users (e.g., also associated with customer nodes/sites 112). Thus, the ICN may be configured to provide the different content of the different owners to their corresponding users based on different requirements associated with the different owners. The requirements may be related to performance (e.g., storage, computing, and/or bandwidth), availability, reliability, security, or combinations thereof. Specifically, the users of the different owned content and owners may be separated into a plurality of VPGs. As such, the different planes in the CON plane infrastructure 120 may be virtualized, e.g., configured or provisioned, to handle and service a plurality of VPG instances that correspond to the VPGs, as described below.

Figure 2:
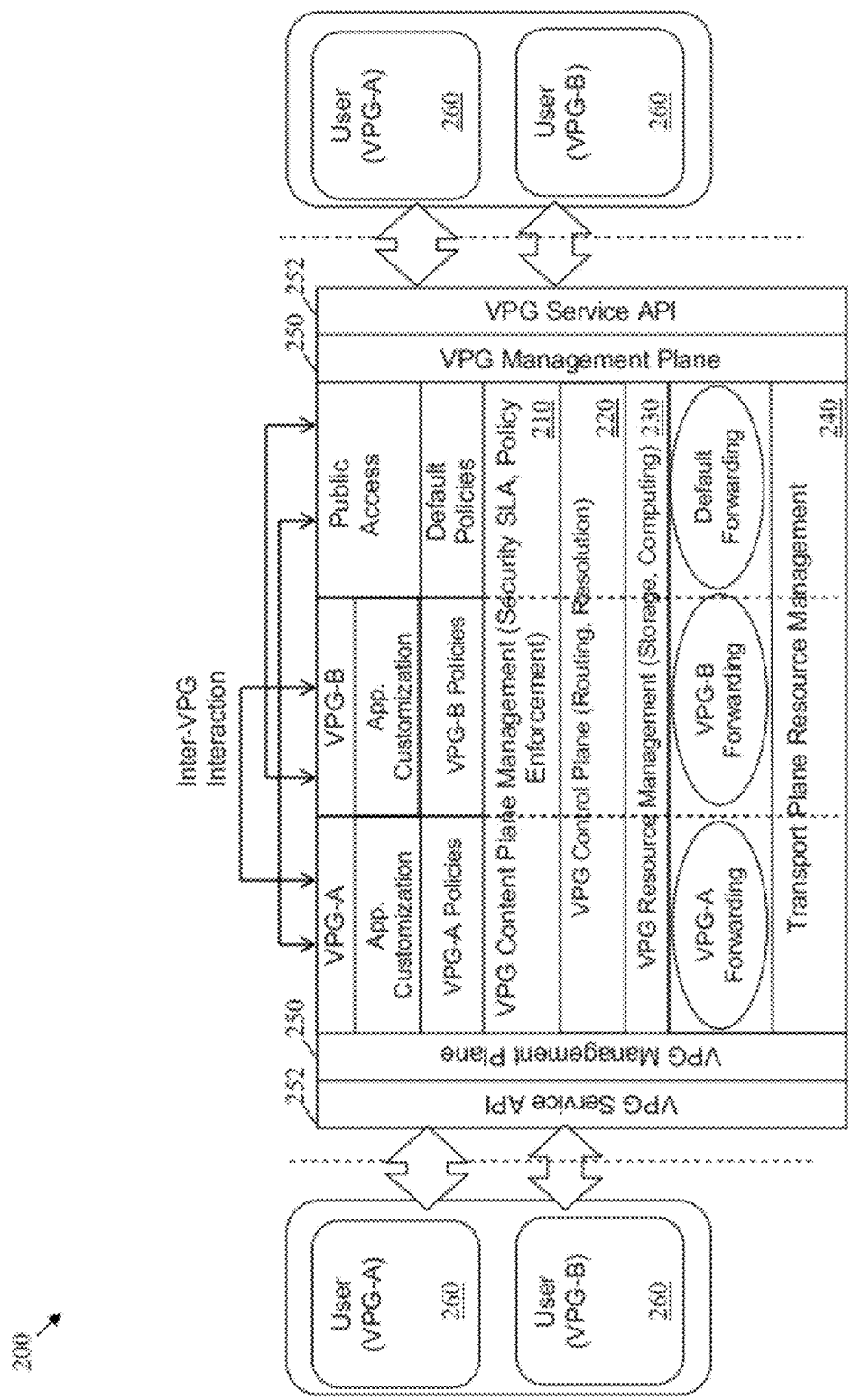
FIG. 2 is a schematic diagram of an embodiment of a CON plane infrastructure.

FIG. 2 illustrates an embodiment of a CON plane infrastructure 200 that may support a plurality of VPGs that have different requirements, SLAs, and/or other policies in an efficient manner. Specifically, the CON plane infrastructure 200 may support a plurality of VPG instances across a plurality of operation planes, e.g., in terms of management, performance, security, and reliability. The VPG instances may comprise a first VPG instance (VPG-A) and a second VPG instance (VPG-B), which may have corresponding applications, customizations, and policies. The CON plane infrastructure 200 may allow inter-VPG interaction between the VPG instances. Additionally, the CON plane infrastructure 200 that may support public access for customers or users that may not belong to the VPG instances, e.g., according to default policies.

The operation planes in the CON plane infrastructure 200 may comprise a VPG content plane 210, a VPG control plane 220, a VPG storage and computing plane 230 (also referred to as resource management plane), a VPG transport plane 240, and a VPG management plane 250 for supporting the different VPG instances and public access based on their corresponding policies. The VPG content plane 210 may be configured to support the different security SLAs of the VPG instances and public access and handle policy enforcement. The VPG control plane 220 may be configured to handle routing and resolution for the different VPG instances and public access. The VPG storage and computing plane 230 may be configured to handle storage and computing for the different VPG instances and public access. The VPG transport plane 240 may be configured to handle data forwarding and resource management for the different VPG instances and public access. The VPG management plane 250 may allow interaction between the different VPG users 260 and the different planes of the CON plane infrastructure 200, e.g., via VPG service application programming interfaces (APIs) 252. The VPG service APIs may be configured to support ICN service primitives and/or application customizations for the different VPG instances. The service APIs may comprise different information, including type, a VPG, user, and/or service identifier (VPG-ID), security information, content, action information, and/or other information.

Figure 3:
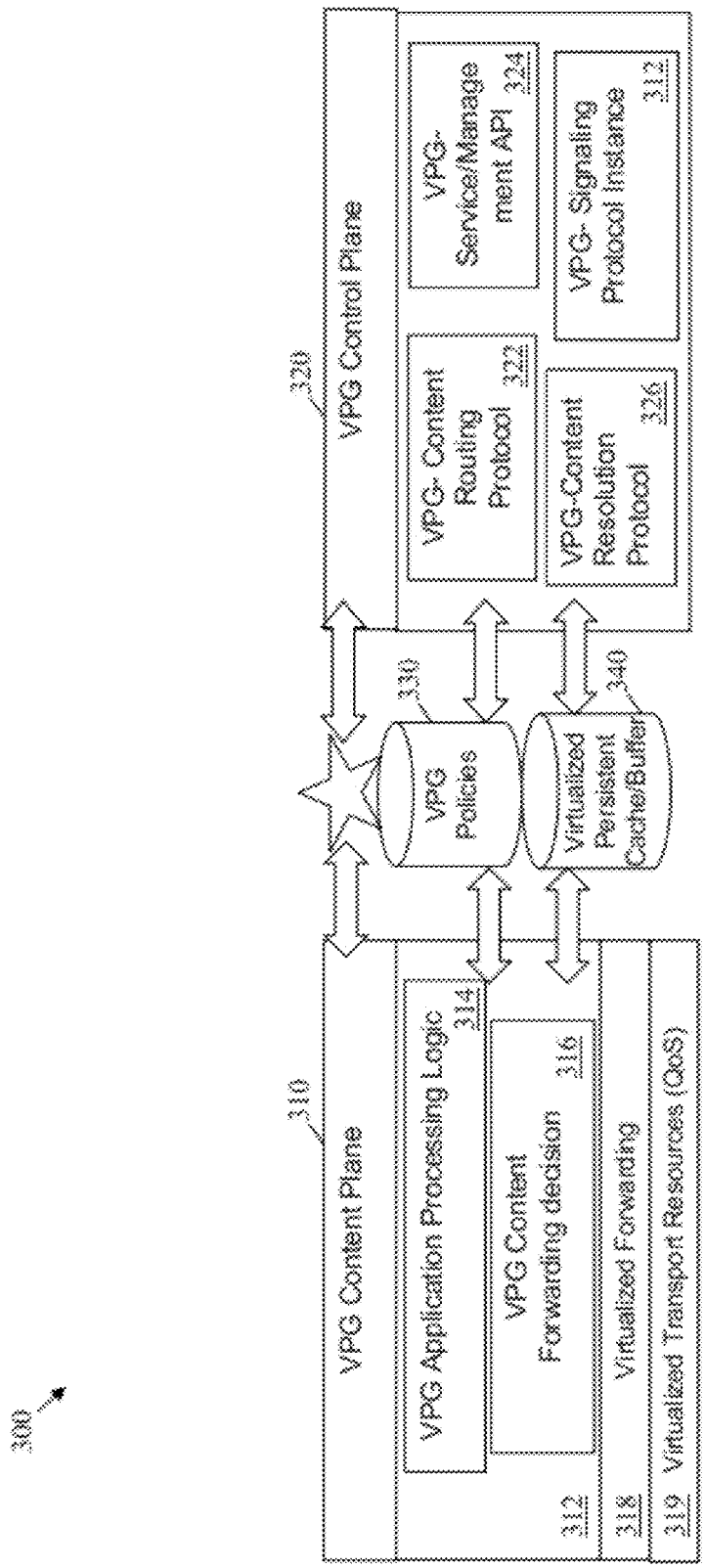
FIG. 3 is a schematic diagram of another embodiment of a VPG state.

FIG. 3 illustrates an embodiment of a VPG state 300 that may be established at a content router to support a VPG instance, e.g., based on the CON plane infrastructure 200. The content router may be configured similar to the content routers described above and may route content objects that belong to a VPG instance using the VPG state 300. In the case of a plurality of VPGs, the content router may establish a VPG state 300 for each VPG instance. The VPG state 300 may route the VPG associated content based on a plurality of corresponding VPG policies 330 and using a persistent cache or buffer 340 dedicated for the VPG instance. The persistent cache or buffer 340 may be a portion of a physical buffer or storage component of the content router.

The VPG state 300 may be implemented at a plurality of operation planes, including a management plane, a content plane, a control plane, and a transport plane. For instance, the VPG state 300 may implement at a VPG content plane 310 a plurality of functions for handling content routing. The content plane functions may be implemented using a VPG application processing logic 314 that may process the content and a VPG forwarding decision 316 that may decide proper routing based on content information. The VPG state 300 may also implement at a VPG control plane 320 a plurality of functions for supporting content routing. The control plane functions may be implemented using a VPG content routing protocol 322, a VPG service/management API 324, a VPG resolution protocol 326, and/or a VPG signaling protocol 312. Additionally, the VPG state 300 may implement at a VPG transport plane a plurality of functions for forwarding the content in the CON. The transport plane functions may be implemented using virtualized forwarding 318, e.g., established for the VPG instance, based on corresponding virtualized transport resources 319 (e.g., QOS resources) for the VPG instance.

A plurality of VPG states 300 at one or more content routers may enable a content router and the CON to provide private treatment for data or content, e.g., for a plurality of VPGs (e.g., content owners), in a public or shared CON infrastructure. This may also enable the VPGs to negotiate different SLAs with a CON or an ICN SP to meet the VPGs' requirements. Thus, the ICN SP may use its resources more effectively, for instance by multiplexing resources among multiple VPGs. The ICN SP may also handle a plurality of users with different requirements by prioritizing failure reactions, such as service restoration in case of failures, based on customer priority.

The VPG SLA requirements may comprise security requirements, accessibility requirements, availability requirements, reliability requirements, QoS requirements, application customization requirements, or combinations thereof. The security requirements may comprise aspects related to authentication/authorization, user privacy, confidentiality, data Integrity, trust management, or combinations thereof. The security requirements may be classified into two security levels, a VPG security level and a VPG member security level. At the VPG security level, the VPG may require a level or amount of security assurance on a plurality of interactions and on VPG content that may be stored in the CON.

The CON may also use a group level security paradigm to implement VPG level security policies across multiple or all members of the CON. At the VPG member security level, the CON may or may not be involved. If the CON is involved, then the CON may enforce finer grained security policy control features in comparison to the VPG level, e.g., as required by the VPG for its members. The CON may also allow the members to define their own security policy in the context of the VPG. A plurality of per-user security level functions may be used and handled exclusively by the VPG customer itself, in which case the CON may not be involved in any security related tasks. Alternatively, the CON may take over the responsibility of delivering all the security related assurances to the members of a VPG. See, e.g., U.S. patent application Ser. No. 13/226,605, filed Sep. 7, 2011 and entitled "Method and Apparatus to Create and Manage a Differentiated Security Framework for Content Oriented Networks." which is incorporated herein by reference. The ideas presented in this patent application could be a type of service a CON provider may provide as a choice to the VPG. In another alternative, a hybrid model may be used where the per-user security level functions may be split between the VPG and the CON. The hybrid model may be a suitable tradeoff from both a complexity and a business model perspective.

One of the reasons a CON customer may be interested in VPG service may be the efficiency the CON provider may offer the customer with respect to disseminating the content to its VPG members. This efficiency may be achieved due to the CON spanning substantially vast geography, and hence covering significant user base, and due to the CON's possible connections with other access/metro/core service providers. In addition to content dissemination efficiency, the VPG may also demand assurance in terms of accessibility, availability, and/or reliability of the VPG's content.

The accessibility requirements may comprise assurance that a member of a VPG is able to access the data in the CON, from a third party network, and/or from anywhere irrespective of whether the member is mobile or has a fixed or less frequently changing location. The availability requirements may comprise assurance with respect to the degree of availability of a piece of content published to the network by the VPG. Availability may be ensured by replicating the content at multiple locations. Replication may be required to make the VPG content dissemination process more efficient, where more replication of data may translate into better QoS to the VPG members. Additionally, replication may be needed to account for failures, such as content router or a link failure which may cause network entities to be disconnected from the network. In this case, replication may allow the accessibility of a copy of the content with improved probability. The reliability requirements may comprise service level assurance with respect to downtime, fail-over, hot standbys, and/or protection switching policies, for instance considering failure of storage or network resources and/or vulnerability of the locations where the CON infrastructure hosts the VPG. The availability factors above may be dependent on the reliability of the infrastructure.

The QoS requirements, e.g., from a content plane perspective, may translate into metrics that matter to the members of the VPG. The QoS requirements may also vary with the type of applications. The mapping of user Quality of Experience (QoE) to network level QoS requirements is well documented in several related standards. For example, in the case of real time services, end-to-end delay and jitter may be more sensitive parameters, where streaming and browsing services are sensitive to response time and packet losses. These performance metrics may be obtained by breaking the end-to-end QoS budgets into control and data plane functions in the content plane. This form of granular budgeting may be the first step to enforce and engineer QoS requirements that may be met in practice. Further, several applications may use the content layer at the users end to publish or retrieve their corresponding content. The content plane interactions may be at the level of an application layer in the Open Systems Interconnection (OSI) model. Allowing the VPG to have an instance of the application in the CON may allow the VPG to disseminate content efficiently to its members and also enhance the member's QoE accordingly, e.g., to ensure the application customization requirements.

Figure 4:
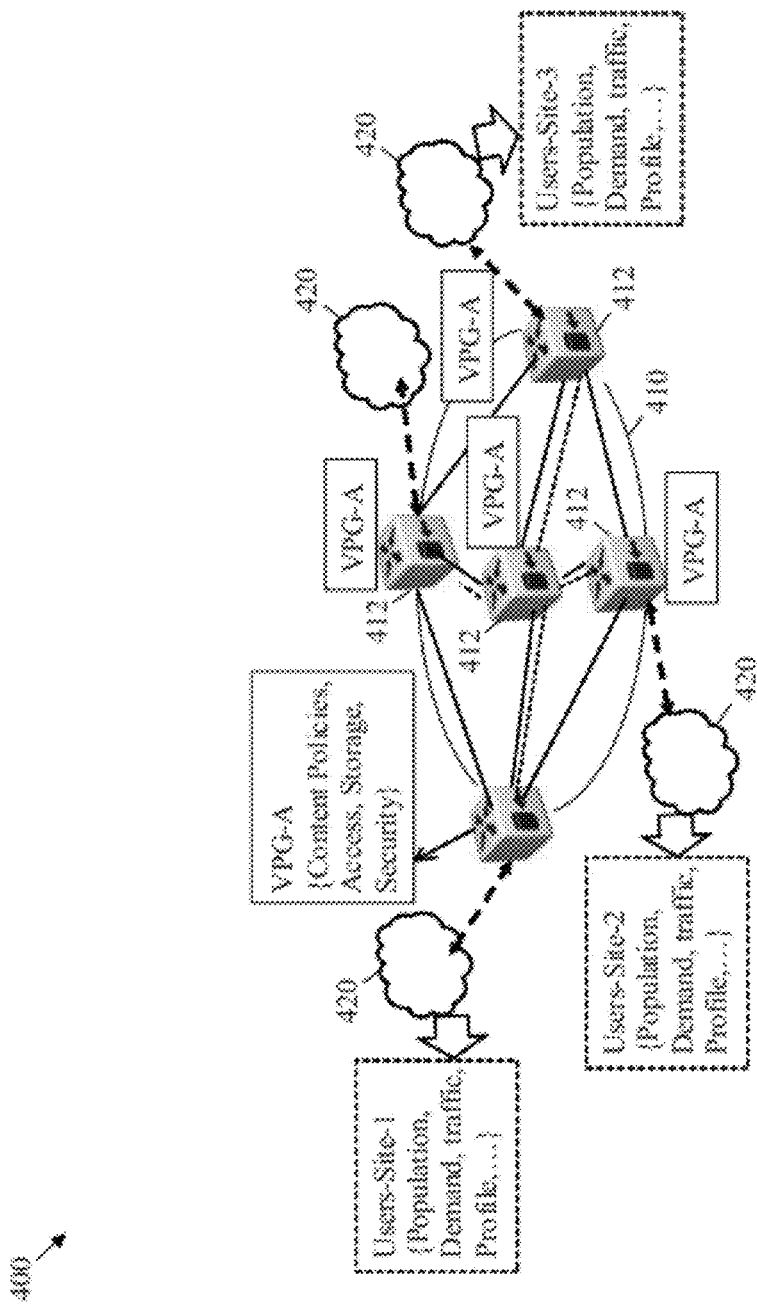
FIG. 4 is a schematic diagram of an embodiment of a VPG instantiation.

FIG. 4 illustrates an embodiment of a VPG instantiation 400. The VPG instantiation 400 may comprise identifying distributed storage, computing, and/or bandwidth resource spread across the network. Some form of connectivity may be used to identify and logically connect these different resources. The VPG instantiation 400 may be implemented in a CON architecture similar to the CON architecture 100. The CON architecture may comprise a CON 410 that comprises a plurality of interconnected content routers 412. The CON 410 and the content routers 412 may be configured similar to the corresponding components above. Some of the content routers 412, e.g., edge nodes, may be coupled to a plurality of customers 420, e.g., via access networks, which may be associated with one or more VPGs. Some of the customer nodes/sites 420 may correspond to the same VPG (VPG-A) and may comprise a plurality of users distributed across a plurality of geographical locations or sites, e.g., Users-Site-1, Users-Site-2, and Users-Site-3. Accordingly, some of the content routers 412 may establish a corresponding VPG instance to handle content routing for VPG-A, e.g., based on the VPG state 300 and the CON plane infrastructure 200.

A VPG instance in a content router 412 may enforce the VPG SLA requirements described at the control, management, and the transport planes related to content dissemination. This may require configuration, storage/transport resource reservation, policy enforcement, and control/data protocol instantiation for each VPG. The VPG instantiation 400 may address where one or more VPGs may be instantiated or established in the CON 410 using a group of content routers 412 for each VPG. The VPG instantiation 400 may also address the amount of resources to be allocated to meet the SLA requirements agreed upon between the VPG and the CON. Theses aspects may be addressed by considering a plurality of factors, including: 1) the geographical spread of the VPG users; 2) the user behavior from which the user request and resulting traffic demand may be predicted for the members of the VPG at a site; 3) the application requirements and type of content requested by the users; and 4) the user expectations in terms of the SLA parameters.

Following the traditional model of provisioning VPNS VPG can be instantiated achieved along the edge nodes without any VPG state in the core of the CONs or ICNs. However, it may be advantageous to leverage the ICN core to improve content delivery. Based on the VPG instantiation scheme 400, both the edge and the core of the CON 410 may be used to establish the VPG instance. However, some but not necessarily all the content routers 412 in the CON 410 may establish VPG states. Any of the content routers 412 in the CON 410 may be capable of caching and hence serving content. Instantiating the VPGs only at the edge nodes may be easier to implement, e.g., in terms of management, but may not provide an optimal or efficient solution for the VPG in terms of content-dissemination. Alternatively, deploying a VPG instance at all or every content router 412 may not be scalable and may substantially increase network overhead. A preferred approach to overcome the limitations of both solutions may be to select a subset of the content routers 412, which may be a compromise of both approaches. As such, a subset of content routers 412 that may be used in the CON 410 may comprise both edge nodes, which may proxy the user requests, and core nodes, which may ensure the VPG SLA requirements.

The VPG instantiation 400 may be implemented for a plurality of VPGs based on a plurality of inputs, including the expected content demand, e.g., geography, user population, number of sites, user behavior, traffic profile, work loads, or combinations thereof. The inputs may also comprise SLA requirements (e.g., in terms of availability and replication), performance (e.g., in terms of throughput and QoE/QoS), reliability (e.g., in terms of downtime, failures, and/or hot-standby)). The inputs may also comprise network aspects, e.g., in terms of storage, computing, and bandwidth resources, and economic considerations, e.g., in terms of service storage/bandwidth/computation cost and resource limitations. The VPG instantiation 400 may be based on an optimization objective, e.g., ICN objectives in terms of reducing resource usage, increasing user QoE, and/or increasing revenues. The VPG instantiation 400 may provide a plurality of outputs, including the subset of content routers 412 where a VPG is to be instantiated, the virtualized or provisioned resources (e.g., for storage and computing) on each selected content router 412, and the bandwidth resources required to ensure performance, availability, and reliability. The outputs may also comprise predetermining the routing over the bandwidth resources or adapting the routing to the VPG requirements. The security of the instantiated VPG instance may be based on the security scheme described in U.S. patent application Ser. No. 13/226,605 filed Sep. 7, 2011 by Xinwen Zhang et al. and entitled "Method and Apparatus to Create and Manage a Differentiated Security Framework for Content Oriented Networks", which is incorporated herein by reference.

One of the considered resources during VPG instantiation is the allocation of the storage resource to the user. This storage may comprise storage space to cache content objects based on the real time needs of the VPG members and persistent storage. Based on the distributed caching scheme that is used, the VPG instances on the content routers 412 may be indexed into local storage (locally in the content routers 412) and/or remote storage (in remote content routers 412). A plurality of collaborative schemes may be applied to improve distributed VPG storage, such as in terms of deciding to cache content locally or use the collaborative model to distribute VPG content based on storage space constraints. The tradeoff between the two approaches may be the efficiency of caching versus the control traffic overhead needed to maintain the cache state of the VPG instances in the content routers 412.

Figure 5:
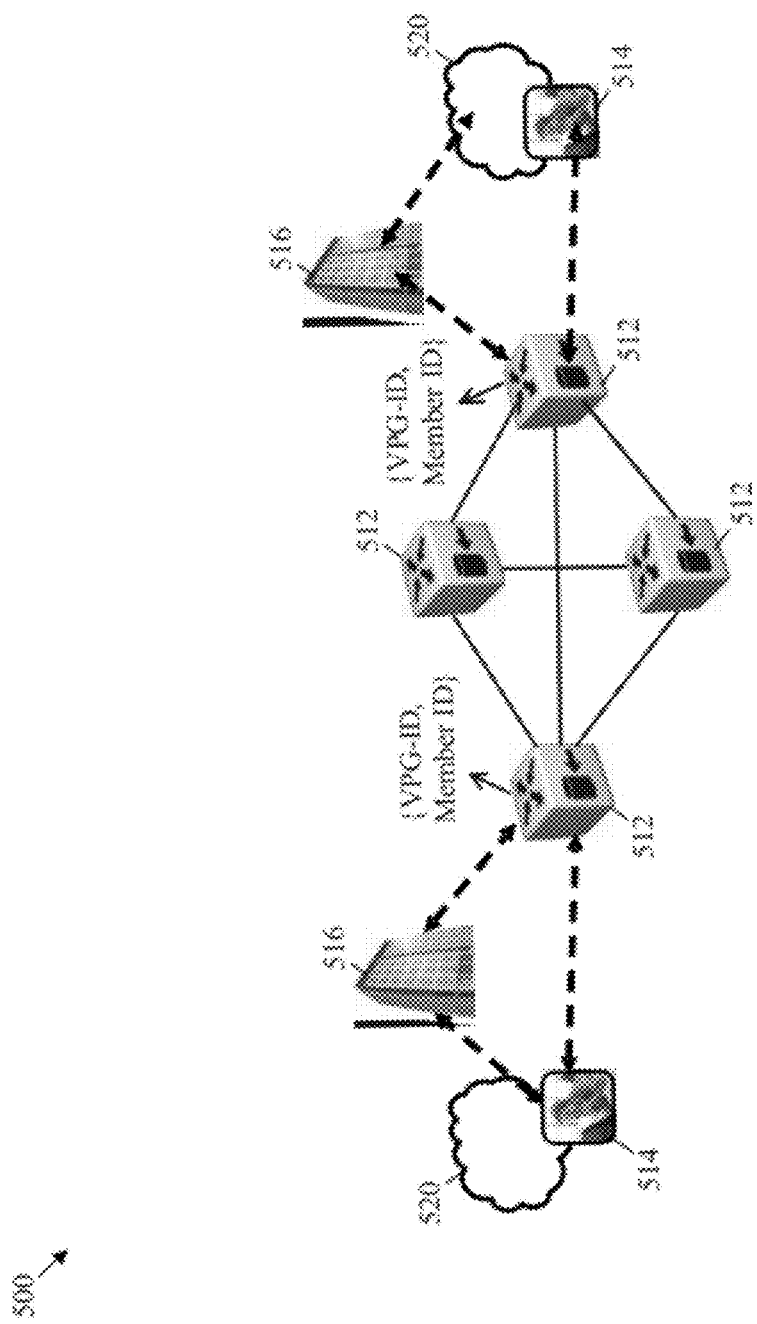
FIG. 5 is a schematic diagram of an embodiment of VPG addressing and access.

FIG. 5 illustrates an embodiment of VPG addressing and access 500 that may be used for an instantiated VPG instance in a CON. The CON may comprise a plurality of interconnected content routers 512, which may be coupled to a plurality of nodes 514 associated with individual users and a plurality of customer sites 516 that may serve a group of users, such as in an Enterprise or Social network. The customer nodes 514 and the customer sites 516 may be configured similar to the corresponding components above. The customer nodes 514 may communicate with the content routers 512 and/or the customer sites 516 via a plurality of access networks 520. The customer nodes 514 and customer sites 516 may correspond to a plurality of VPGs.

The VPG addressing and access 500 may be used to ensure appropriate association of the VPG sourced interaction (e.g., at the management, control, and data planes) to the VPG instance on the content routers 512. This may require the identification of the publish/request and data flows pertaining to the VPG instance at each content router 512 associated with the VPG instance. This may be achieved by associating a plurality of VPG IDs to the corresponding VPG instances at the content routers 512. For the further control of the service access, the VPG-ID may be concatenated with user or member IDs associated with the VPG users, e.g., the customer nodes 514 and/or customer sites 516. This level of control may allow setting up Access Control Lists (ACLs) per VPG instance. Additionally, other network level IDs may be used by the CON operator to distinguish between the VPG instances. Such IDs may be required for control plane and data plane operation within the CON's context.

Figure 6:
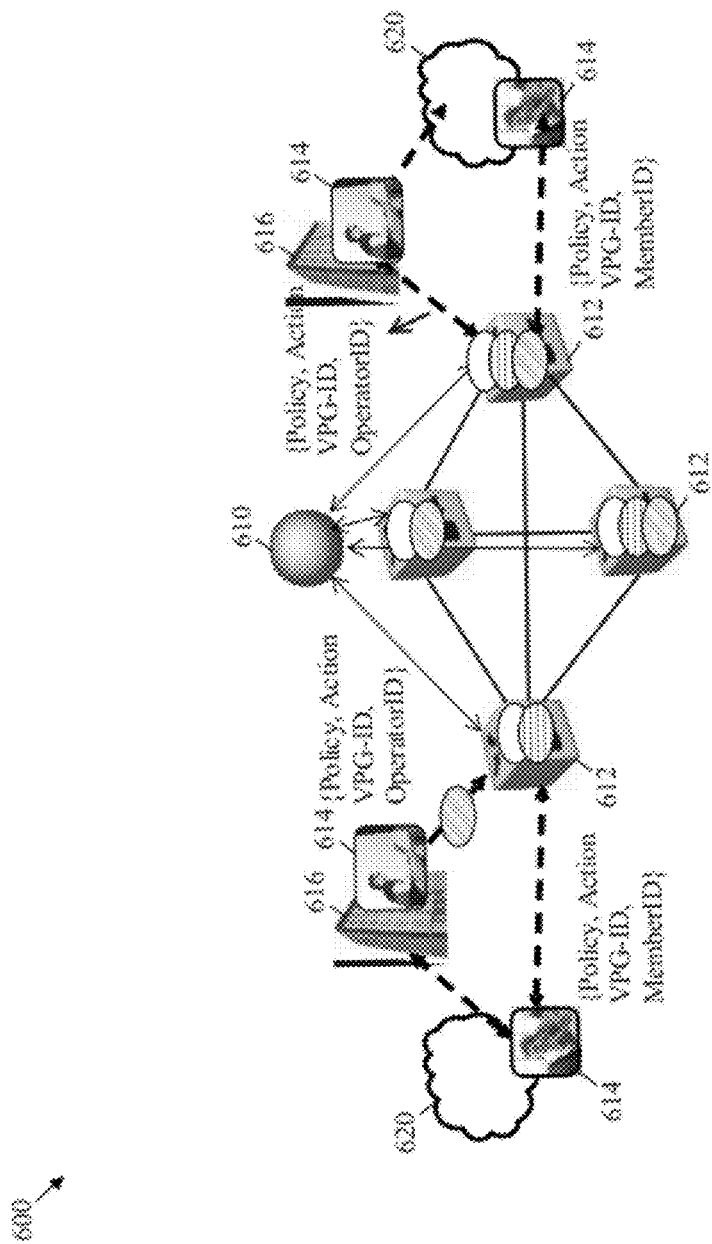
FIG. 6 is a schematic diagram of an embodiment of a VPG management plane virtualization.

FIG. 6 illustrates an embodiment of a VPG management plane virtualization 600 that may be used at the management plane to support operations for an instantiated VPG instance in a CON. The CON may comprise a plurality of interconnected content routers 612, a plurality of customer nodes 614, a plurality of customer sites 616, and a plurality of access networks 620, which may be configured substantially similar to the corresponding components above. The customer nodes 614 may be coupled directly to the customer sites 616, which may be customer operators or content providers for the customer nodes 614, or via the access networks 620, as shown in FIG. 6. The customer nodes 614 and customer sites 616 may correspond to a plurality of VPGs. The corresponding VPG instances provisioned at the content routers 612 are indicated in FIG. 6 by a plurality of ellipses that have different patterns. In the VPG management plane virtualization 600, a user (e.g., customer node 614) or VPG customer operator (e.g., customer site 616) may manage the policies that define the operation of the VPG. The managed policies may be based on policy management and SLA management.

Policy management may comprise differentiating policies with respect to privileges awarded to the member of VPG versus the customer side operator of the VPG. The management related interaction with the VPG may be authorized by appropriate security policies taking the privileges into consideration. The member related management privileges may be initially set by the customer operator. For member related interaction, the first step of authorization may be implemented by the customer, which may allow fine grained privilege differentiation among the members of the VPG. This first step of management interaction may be authorized by the VPG customer and subsequently by the CON. The customer operator may be capable of defining policies within the bounds of the SLA parameters that are agreed between the VPG and the service provider. Any policy defined by the operator may be applied to all the VPG instances in the CON. This may be achieved using a centralized entity 610 or a decentralized mechanism.

In a centralized approach, the VPG customer, e.g., a customer node 614, may trigger policy changes by interacting with the first hop CON proxy, e.g., a content router 612 at the edge of the CON. The customer node 614 may send one or more policies, actions required, VPG IDs and operator IDs (for the customer operators or the customer sites 616) or Member IDs (for the customer nodes 514) to the CON proxy to trigger policy changes. The CON proxy may then forward a request to the centralized entity 610 that may be a CON end VPG manager to identify the VPG instances in the CON and apply the related policies consistently across all the VPG instances. The centralized approach may be further extended for member interactions, where the member defined policies (e.g. policies of a group within the VPG) may be applied across all the VPG instances. Alternatively, a decentralized approach may be implemented where the VPN's control plane may be leveraged to propagate and synchronize the policies across all the VPG instances.

The SLA management may handle the policies related to measuring and monitoring the VPG statistics and comparing the policies with existing SLAs, e.g., to decide if the CON SP is abiding by the agreed SLAs. The monitoring of VPG statistics may be achieved between the VPG sites, e.g., by monitoring the members traffic and response statistics. In some scenarios, the monitoring of VPG statistics may also be achieved by collaboration with the CON. In such scenarios, the CON may share some of the VPG statistics collected at its edges with the VPG customer.

The VPG management plane virtualization 600 may comprise per-VPG level management functions, such as for VPG addressing, provisioning, and VPG management. VPG addressing may use unique global identifiers, which may comprise a plurality of verifiable VPG IDs for the VPG instances and additional identifiers, e.g., at the user/service level, such as the customer operator ID and/or Member ID, which may be needed based on the VPG service definition and VPG content addressing. VPG addressing may be in line with naming semantics or any other flat naming constructs. As such, the interactions with the VPG may be tagged to virtually or physically separate the VPG interactions in the ICN SLA policy management, e.g., static or dynamic negotiation and enforcement. VPG addressing may be used in security features for user privacy (e.g., handling personal and confidential data), user authentication, data integrity, operator policy, access authentication/authorization, content plane resource (e.g., storage and computation), availability (e.g., replication), and reliability (e.g., downtime, fail-over/protection switching policies, hot standby). VPG addressing may be used in configuring transport plane resources associated with QoS (e.g., response time and bandwidth), point of local repair (PLR), and/or latency. VPG addressing may also be used for service API reliability (e.g., publish, request, modify, and/or delete operations). Provisioning may comprise VPG instantiation, e.g., to fulfill VPG requirements and optimization objective as described above, and accounting operations, e.g., to obtain user traffic statistics and charging for services. VPG management may comprise managing user versus VPG operator versus ICN SP privileges, and service APIs, which may be controlled by a user network interface (UNI) to trigger changes in the VPG. The VPG service may be centrally managed by the ICN SP. In one embodiment, VPG management may be based on a business model where the instantiated instances may be controlled by the corresponding VPGs.

Figure 7:
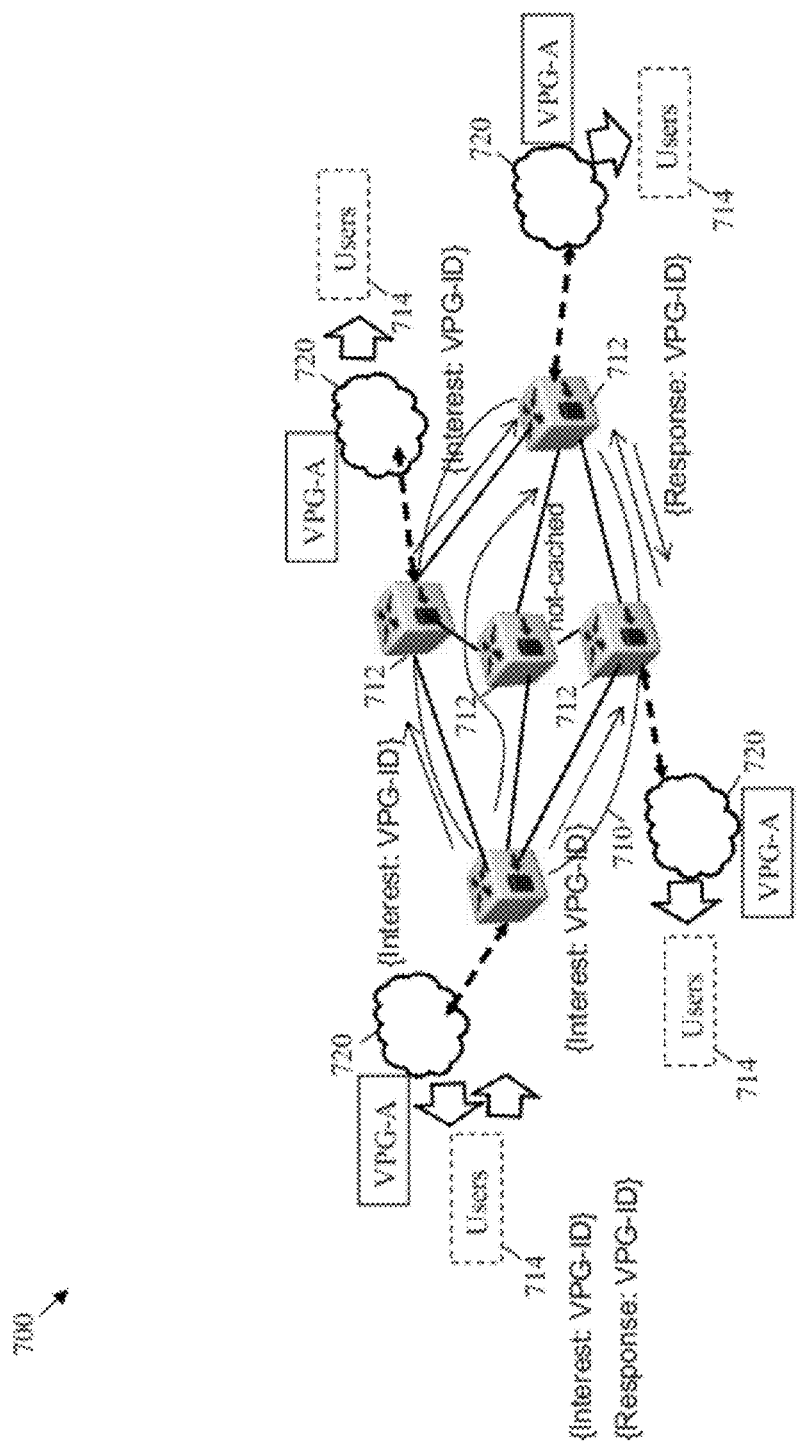
FIG. 7 is a schematic diagram of an embodiment of a VPG storage and computing plane virtualization.

FIG. 7 illustrates an embodiment of a VPG storage and computing plane virtualization 700 that may be used to support storage/caching for a plurality of VPG instances at the storage and computing plane in a CON. The CON may comprise a plurality of interconnected content routers 712, a plurality of customer nodes 714, and a plurality of access networks 720, which may be configured substantially similar to the corresponding components above.

In the VPG storage and computing plane virtualization 700, storage and computation may be distributed in the CON according to how the corresponding VPGs were instantiated. Each content router 712 that comprises a VPG state may have its provisioned or virtualized private storage and computing resource for that VPG. However, the content storing and computation may not be required in all the VPG instances on all the content routers 712. For example, content for one VPG (VPG-A) may be distributed based on computation and sorted at the edge content routers 712 but not the core content routers 712. Further policies may be applied over the storage and computing resources to prioritize their usage among the VPGs' content and applications. Based on the control plan intelligence, user requests to publish/subscribe content (e.g., using VPG IDs) may leverage or make use of the availability of the distributed storage and computation resource to maximize or improve content dissemination efficiency. A centralized mode of content resolution, e.g., at a centralized CON entity, may depend on VPG repositories, e.g., local stores/caches at the content routers 712, to store/cache and retrieve distributed content portions or chunks across the content routers 712. Such distributed content resolution scheme may be optimized for static content. In this case, dynamic content may be staged before being retrieved. Alternatively, a decentralized mode may explore the VPG instances to resolve the content and treat all content as dynamic content.

Figure 8:
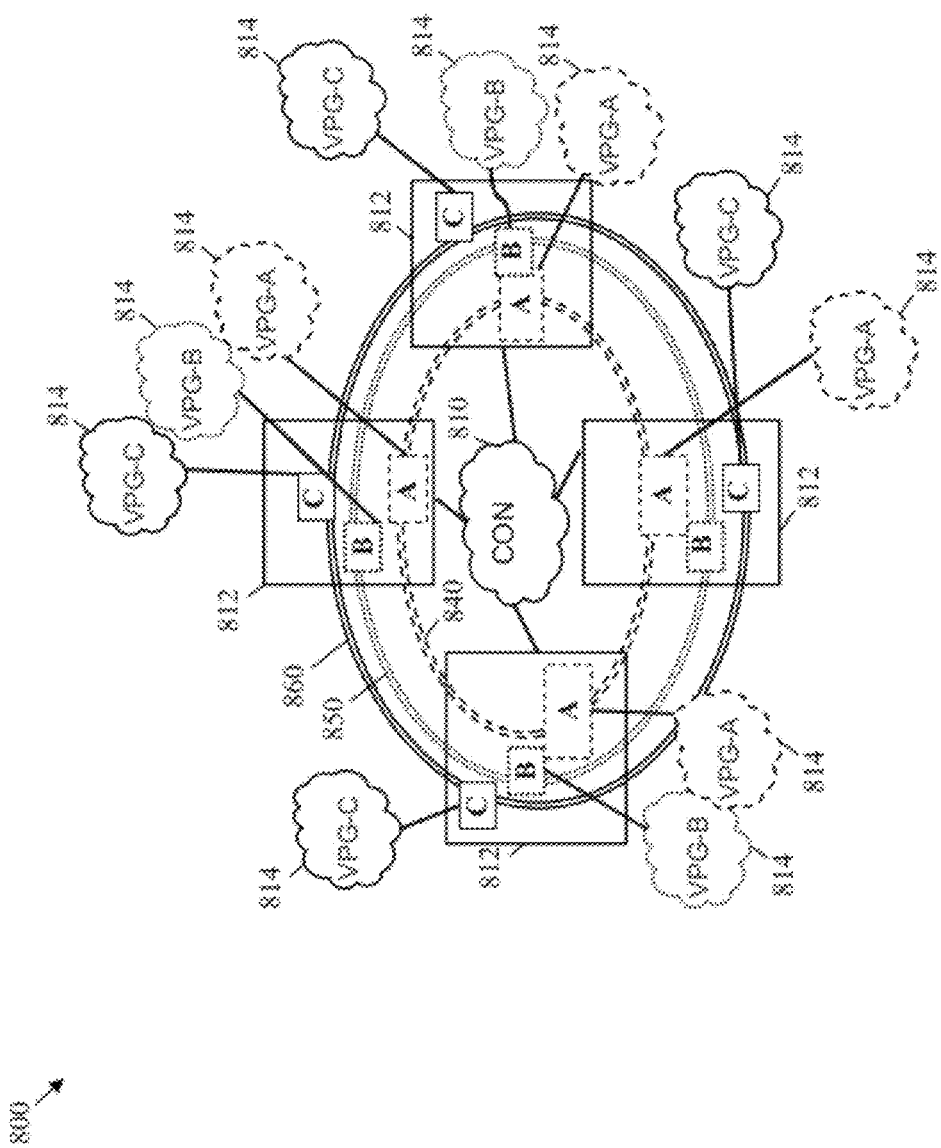
FIG. 8 is a schematic diagram of an embodiment of a VPG control plane virtualization.

FIG. 8 illustrates an embodiment of a VPG control plane virtualization 800 that may be used to manage control plane protocol message exchanges for a plurality of VPG instances at the control plane in a CON 810. The protocol message exchanges may be related to content publishing/request, routing, name resolution, collaborative caching, and/or other protocols to enable efficient content dissemination. The CON 810 may comprise a plurality of content routers 812 coupled to a plurality of customer nodes/sites 814, which may be configured as described in the embodiments above. For example, the VPG control plane virtualization 800 may manage a plurality of protocol message exchanges for a first VPG (VPG-A), a second VPG (VPG-B), and a third VPG (VPG-C). As such, the content routers 812 may establish three separate VPG states for each corresponding instantiated VPG instance. The VPG states may comprise a first VPG state (A) for VPG-A, a second VPG state (B) for VPG-B, and a third VPG state (C) for VPG-C. Specifically, the content routers 812 over which the VPG instances have been instantiated may establish a corresponding control protocol instance for each of the VPG instances. For example, the content routers 812 may establish a first control protocol instance 840 for VPG-A, a second control protocol instance 850 for VPG-B, and a third control protocol instance 860 for VPG-C.

The VPG control plane virtualization 800 may be used to manage the control plane protocol exchange between the same VPG instance distributed across the CON 810, e.g., across the content routers 812. The message exchange may comprise a plurality of functions related to managing the VPG policies, cache resources, name resolution management, content forwarding table, replication, and data consistency management in the context of a VPG. As such, multiple replicated control plane instances (at multiple content routers 812) may be used for each VPG, which may ensure substantially complete isolation between the VPG instances and exchanges and relatively easy provisioning but may lead to excessive overhead. For example, the VPG control plane virtualization 800 may use a Distributed Hashed Table (DHT) for each VPG instance to handle user publish/request actions that require appropriate content indexing and name resolution. Using such a per-VPG control plane approach, multiple instances of the DHT may be created per VPG. In this case, each VPG-DHT instance may operate independent of one another. The disadvantage of this approach is the overhead associated with multiple instances of the DHT protocol.

Figure 9:
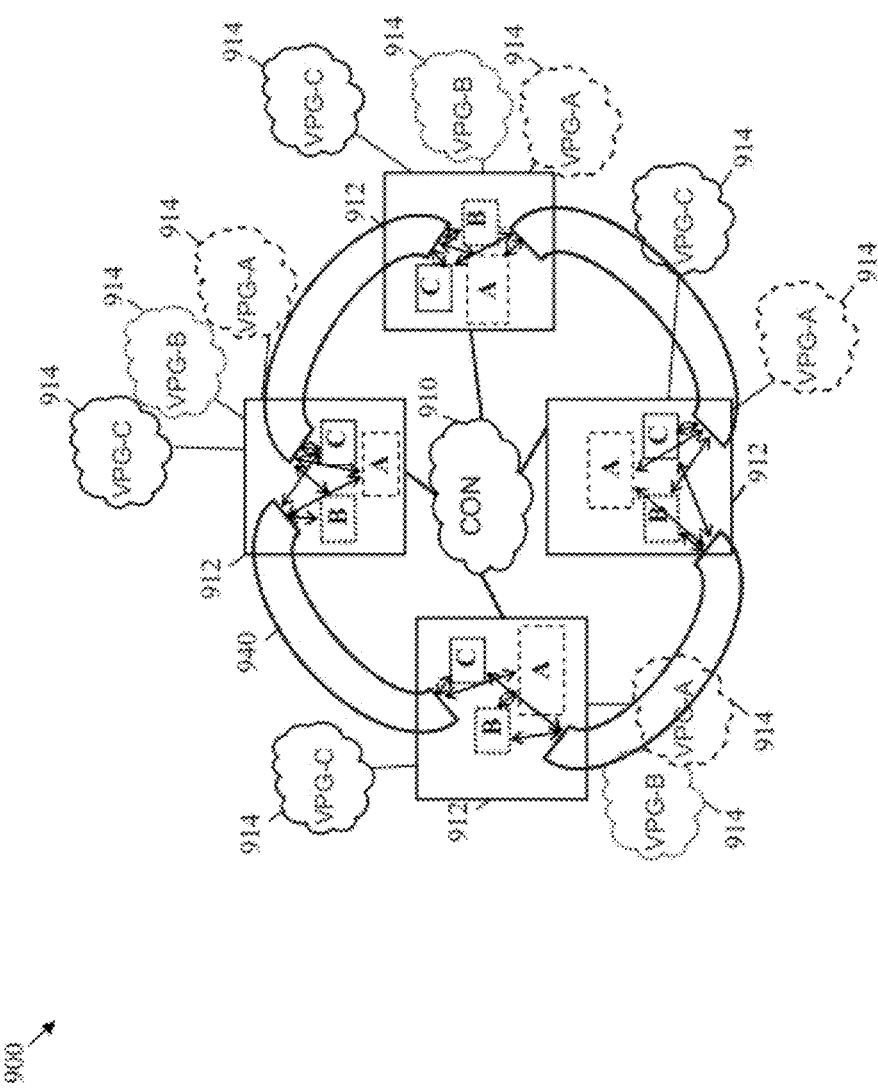
FIG. 9 is a schematic diagram of another embodiment of a VPG control plane virtualization.

FIG. 9 illustrates an embodiment of another VPG control plane virtualization 900 that may be used to manage protocol message exchanges for a plurality of VPG instances at the control plane in a CON 910. The CON 910 may comprise a plurality of content routers 912 coupled to a plurality of customer nodes/sites 914, which may be configured as described in the embodiments above. For example, the VPG control plane virtualization 900 may manage a plurality of protocol message exchanges for a first VPG (VPG-A), a second VPG (VPG-B), and a third VPG (VPG-C). As such, the content routers 912 may establish three separate VPG states for each corresponding instantiated VPG instance. The VPG states may comprise a first VPG state (A) for VPG-A, a second VPG state (B) for VPG-B, and a third VPG state (C) for VPG-C. Specifically, the content routers 912 over which the VPG instances have been instantiated may establish a single protocol instance 940 for all the VPG instances. The content routers 912 may appropriately de-multiplex the protocol exchange messages for VPG-A, VPG-B, and VPG-C based on the individual VPG IDs associated with the different VPG states A, B, and C or instances.

Similar to VPG control plane virtualization 800, the VPG control plane virtualization 900 may be used to manage the control plane protocol exchange between the same VPG instance distributed across the CON 910, e.g., across the content routers 912. However, the VPG control plane virtualization 900 may use a single instance of the control plane and associate appropriate demultiplexing properties, e.g., using filter attributes to control plane messages and map the messages to the proper VPG instance. The VPG control plane virtualization 900 may use a single DHT for all the VPG instances to handle user publish/request actions that require appropriate content indexing and name resolution. This may require provisioning VPG IDs associated with the control plane messages when exchanging the messages between the CON nodes and/or content routers 912 involved in the control plane operations.

Figure 10:
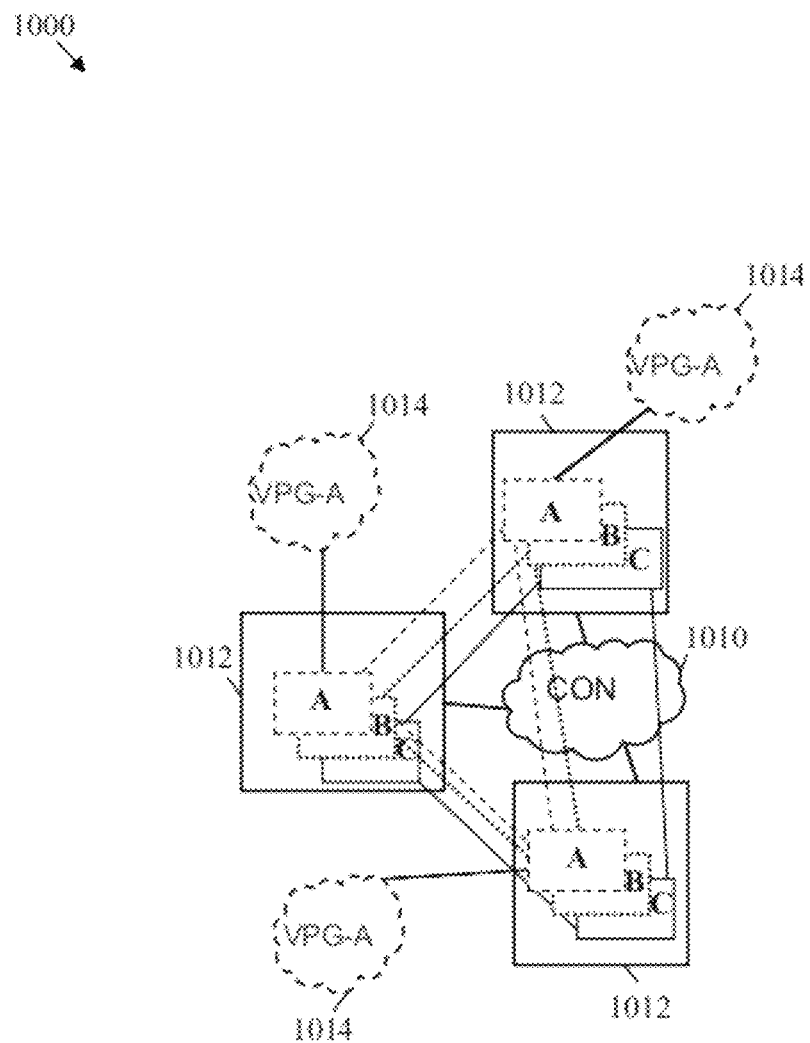
FIG. 10 is a schematic diagram of another embodiment of a VPG control plane virtualization.

FIG. 10 illustrates an embodiment of another VPG control plane virtualization 1000 that may be used to manage protocol message exchanges for a plurality of VPG instances at the control plane in a CON 1010. The CON 1010 may comprise a plurality of content routers 1012 coupled to a plurality of customer nodes/sites 1014, which may be configured as described in the embodiments above. For example, the VPG control plane virtualization 1000 may manage a plurality of protocol message exchanges for a first VPG (VPG-A), a second VPG (VPG-B), and a third VPG (VPG-C) (VPG-B and VPG-C are not shown). As such, the content routers 1012 may establish three separate VPG states for each corresponding instantiated VPG instance, comprising a first VPG state (A) for VPG-A, a second VPG state (B) for VPG-B, and a third VPG state (C) for VPG-C.

Specifically, the content routers 1012 may establish a corresponding control protocol instance for each of the VPG instances using prefix based content routing paradigms. Each content router 1012 may host multiple VPG instances using a state of pending table, cached data, and forwarding data for each instance to handle the interest packets. The content routers 1012 may use routing protocols, such as open shortest path first (OSPF) and/or intermediate system to intermediate system (IS-IS), to enable per VPG instance to manage the forwarding tables. The content routers 1012 may establish a virtual forwarding information base (VFIB) for each VPG instance to handle the forwarding of the packets for each instance. In some embodiments, the content router 1012 may also use algorithms for content routing, name resolution and/or server selection for each VPG instance that meet the corresponding VPG requirements. For example, server selection (the choice of servers and network paths) for each VPG may be different, and thus the content router 1012 may use a corresponding different server selection algorithm for each VPG.

Figure 11:
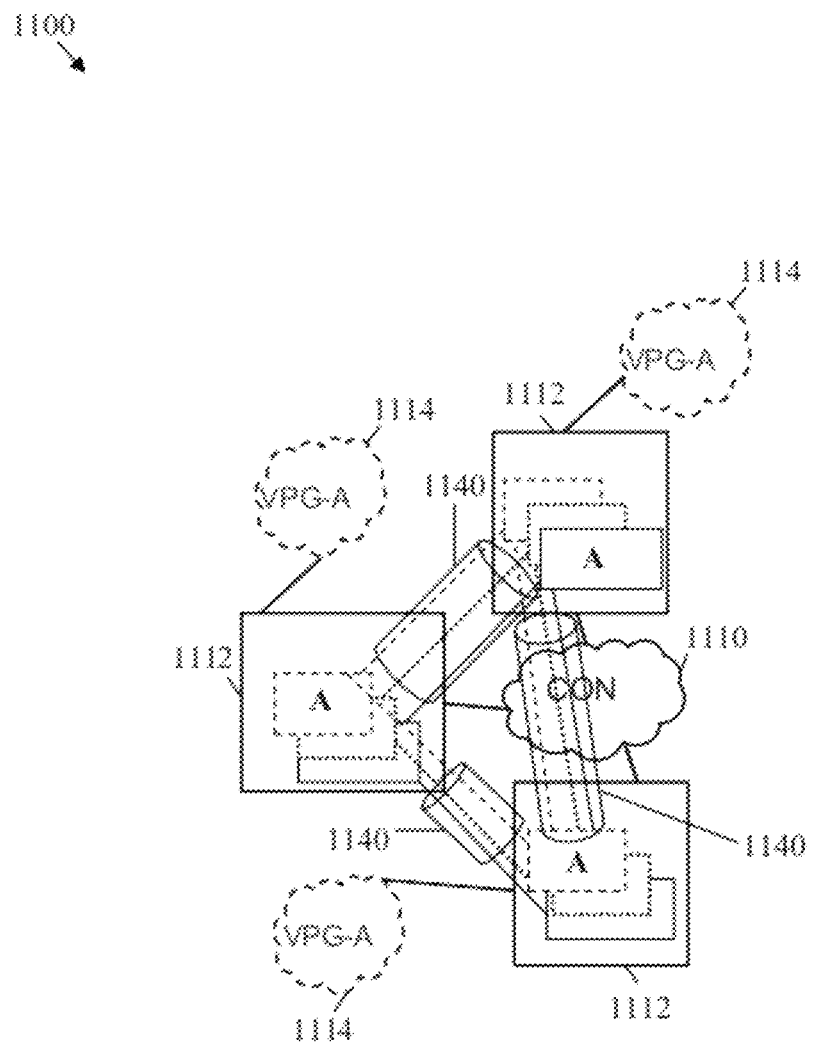
FIG. 11 is a schematic diagram of another embodiment of a VPG control plane virtualization.

FIG. 11 illustrates an embodiment of another VPG control plane virtualization 1100 that may be used to manage protocol message exchanges for a plurality of VPG instances at the control plane in a CON 1110. The CON 1110 may comprise a plurality of content routers 1112 coupled to a plurality of customer nodes/sites 1114, which may be configured as described in the embodiments above. For example, the VPG control plane virtualization 1100 may manage a plurality of protocol message exchanges for a first VPG (VPG-A), a second VPG (VPG-B), and a third VPG (VPG-C) (VPG-B and VPG-C are not shown). As such, the content routers 1112 may establish three separate VPG states for each corresponding instantiated VPG instance, comprising a first VPG state (A) for VPG-A, a second VPG state (B) for VPG-B, and a third VPG state (C) for VPG-C. Specifically, the content routers 1112 may establish a single control protocol instance 1140 for all the VPG instances using prefix based content routing paradigms. Each content router 1112 may host a single state of pending table, cached data, and forwarding data for all the VPG instances to handle the interest packets. As such, the content routers 1112 may use a demultiplexing scheme to route the protocol messages to the appropriate VPG instances.

Figure 12:
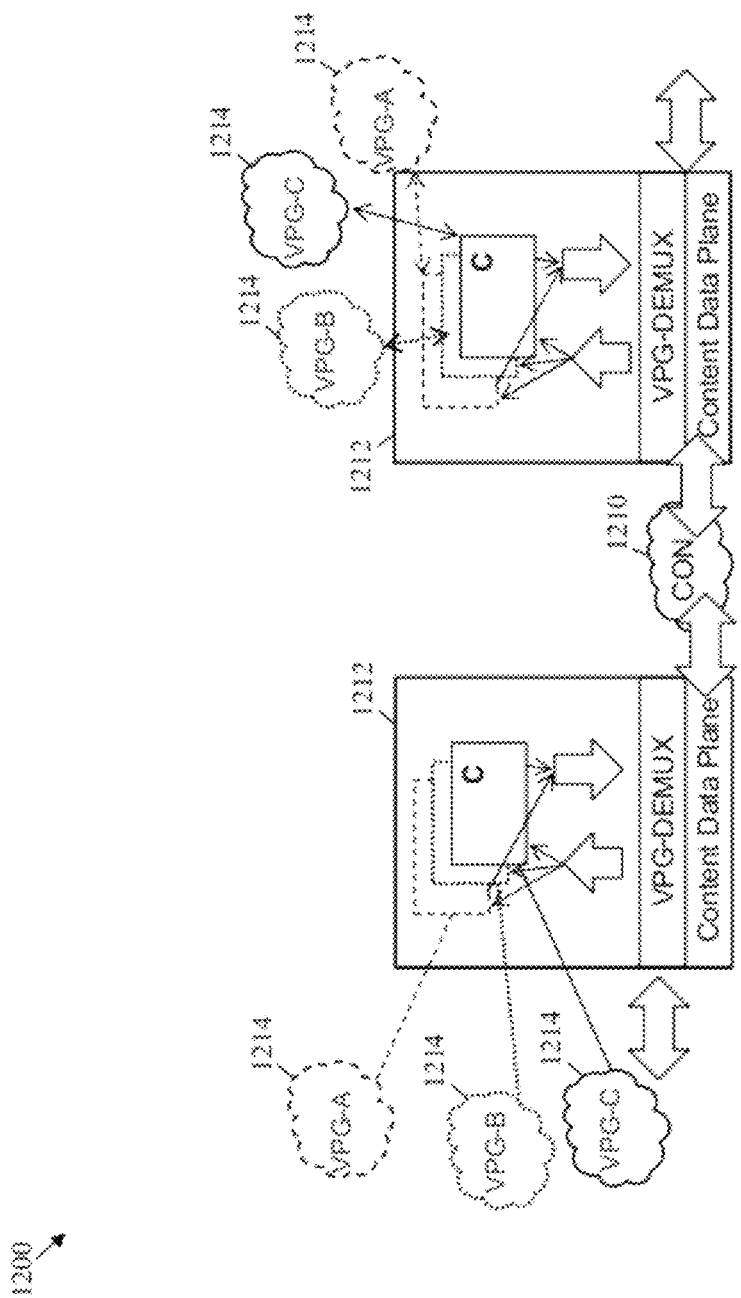
FIG. 12 is a schematic diagram of another embodiment of a VPG data plane virtualization.

FIG. 12 illustrates an embodiment of a VPG data plane virtualization 1200 that may be used to handle content data received and transmitted for a plurality of VPG instances at the data or content data plane in a CON 1210. The CON 1210 may comprise a plurality of content routers 1212 coupled to a plurality of customer nodes/sites 1214, which may be configured as described in the embodiments above. For example, the VPG data plane virtualization 1200 may handle content data for a first VPG (VPG-A), a second VPG (VPG-B), and a third VPG (VPG-C). Thus, the content routers 1212 may establish three separate VPG states for each corresponding instantiated VPG instance, comprising a first VPG state (A) for VPG-A, a second VPG state (B) for VPG-B, and a third VPG state (C) for VPG-C.

The content data may correspond to both the user interest emanating from a VPG and data response packets corresponding to the expressed interests. The content portions or chunks exchanged between the VPG instances and/or the content router 1212 may be encoded with specific attributes, such as the content name that a content portion pertains to or the VPG ID of the VPG instance that the content portion originated from or is to be mapped into at a receiving end. Such meta-data may be used to map the received data to appropriate VPG instances. The VPG data entering the CON 1210 boundary may be identified by the content router 1212 as it is tagged, demultiplexed, and processed in the corresponding VPG instance. The resolution of content request to location and forwarding decision may also be taken in the context of the VPG instance. Further, SLA policies (e.g., for performance, security, availability, and reliability) may be enforced over the interest requests/data responses (e.g., content portions) in the context of each VPG. This may trigger interaction with the VPG control plane.

Figure 13:
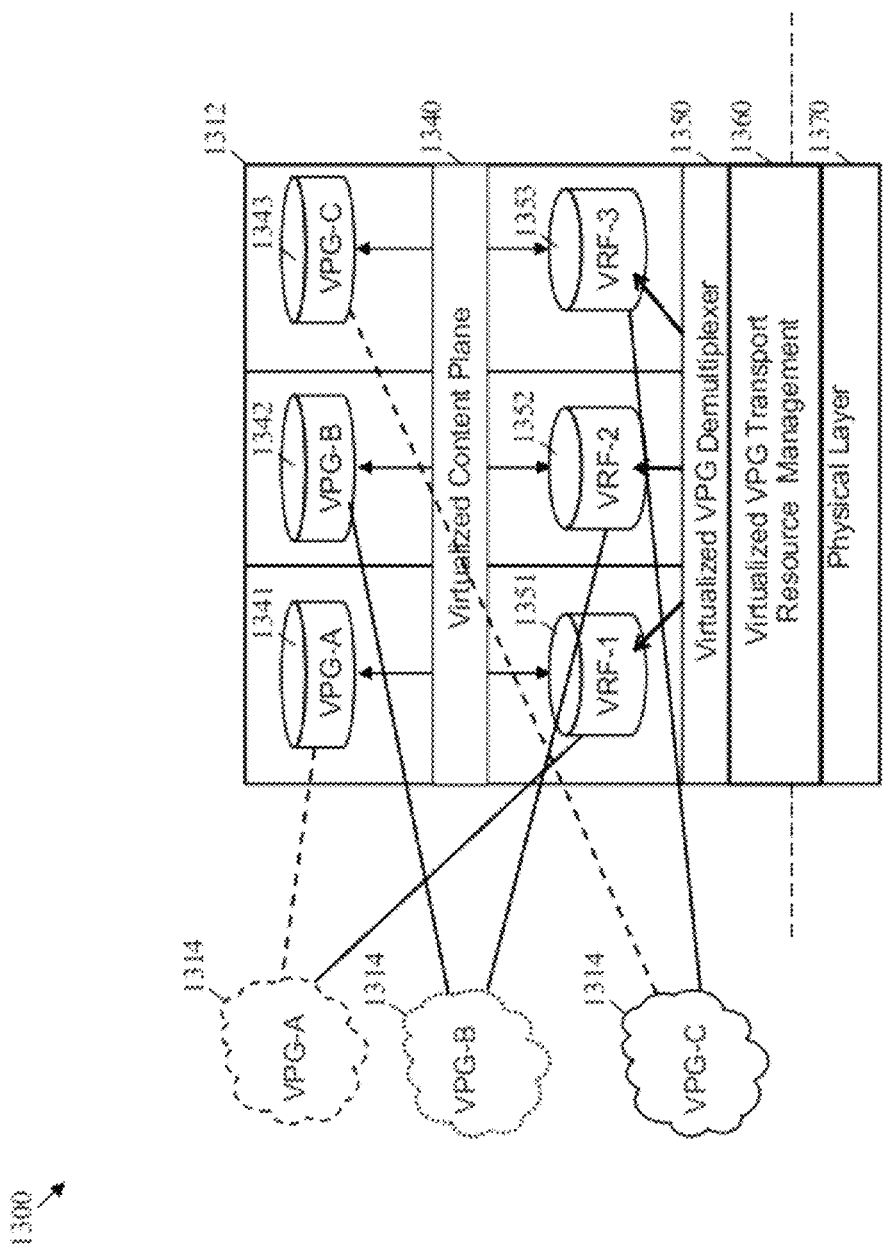
FIG. 13 is a schematic diagram of an embodiment of a VPG transport plane virtualization.

FIG. 13 illustrates an embodiment of a VPG transport plane virtualization 1300 that provides a plurality of forwarding instances for a plurality of VPG instances at the transport plane in a CON 1210. The forwarding instances may support reachability between the VPG instances and/or the content routers 1312 and corresponding resource management functions for transporting data between the VPG instances/content routers 1312. The CON may comprise a plurality of content routers 1312 (only one is shown) coupled to a plurality of customer nodes/sites 1314, which may be configured as described in the embodiments above. For example, the VPG transport plane virtualization 1300 may establish forwarding instances for a first VPG 1341 (VPG-A), a second VPG 1342 (VPG-B), and a third VPG 1343 (VPG-C). Thus, the content routers 1312 may establish three separate VPG states for each corresponding instantiated VPG instance.

One or more VPG instances may span across the CON, e.g., across the content routers 1312. The network nodes, e.g., the content routers 1312 may be configured to demultiplex the incoming content portions and/or control message exchanges of the different VPG instances. The CON's or ICN's content plane may be a transport plane aware, e.g., aware of the transport plane functions. For incoming traffic, the content plane may be configured to map existing transport virtualization constructs, such as VPN Routing and Forwarding Table (VRF), virtual router (VR), and/or Virtual Private Local Area Network Service (VPLS) constructs, which may be used in current networks or technologies.

For example, VPG-A 1341, VPG-B 1342, and VPG-C 1343 at the content data plane 1340 may be mapped into corresponding VRF/VPG-1 instance 1351, VRF/VPG-2 instance 1352, and VRF/VPG-3 instance 1353, respectively at the transport plane using appropriate constructs required to map the traffic to the right VRF instance. The content router 1312 may receive a plurality of packets associated with VPG-A, VPG-B, and VPG-C at a transport physical layer 1370. The received packets may be processed by a virtualized VPG resource management function 1360 and then demultiplexed by a virtualized VPG demultiplexer 1350. The packets may be demultiplexed properly into the corresponding VRF/VPG-1 instance 1351, VRF/VPG-2 instance 1352, and VRF/VPG-3 instance 1353, e.g., at the transport plane. The transport plane instances may then be properly mapped into the content plane instances VPG-A 1341, VPG-B 1342, and VPG-C 1343.

For outgoing traffic, the content plane instances VPG-A 1341, VPG-B 1342, and VPG-C 1343 may also be mapped into the transport plane VRF/VPG-1 instance 1351, VRF/VPG-2 instance 1352, and VRF/VPG-3 instance 1353, in a reverse manner. At the forwarding level, the content routers 1312 may be configured to add policies to handle different content requests/responses differently. The content plane interaction between any two content routers may be mapped to their corresponding transport layer virtualization, so that the traffic for a VPG instance may traverse the correct instance in the transport plane. Mapping content plane virtualization allows stretching virtualization from application to transport layer.

Transport plane virtualization may be realized by the provider provisioned VPNs. This level of virtualization may allow multiple VPNs to be configured and managed by the VPN service provider. The features provided by such a service may comprise virtual separation of the control and data transport among the hosted VPNs, customized Traffic Engineering (TE) and QoS to meet the individual needs of the VPNs, and security of data traversing between the VPN sites. VPN virtualization may be supported at layer three (L3) and layer two (L2) of the Open Systems Interconnection (OSI) model. The content plane virtualization may be logically connected to the transport plane virtualization, as described above, so that the customization may be extended to all layers of the OSI model. In this case, in addition to content dissemination customization, the VPG may also negotiate SLAs for transport plane connectivity property at the transport plane. The SLA parameters may comprise VPN topology/connectivity and QoS properties based on the traffic offered between the sites. This coupling between the content plane and the transport plane may enable the scope for customized joint TE and SS optimization within a VPG's context.

Figure 14:
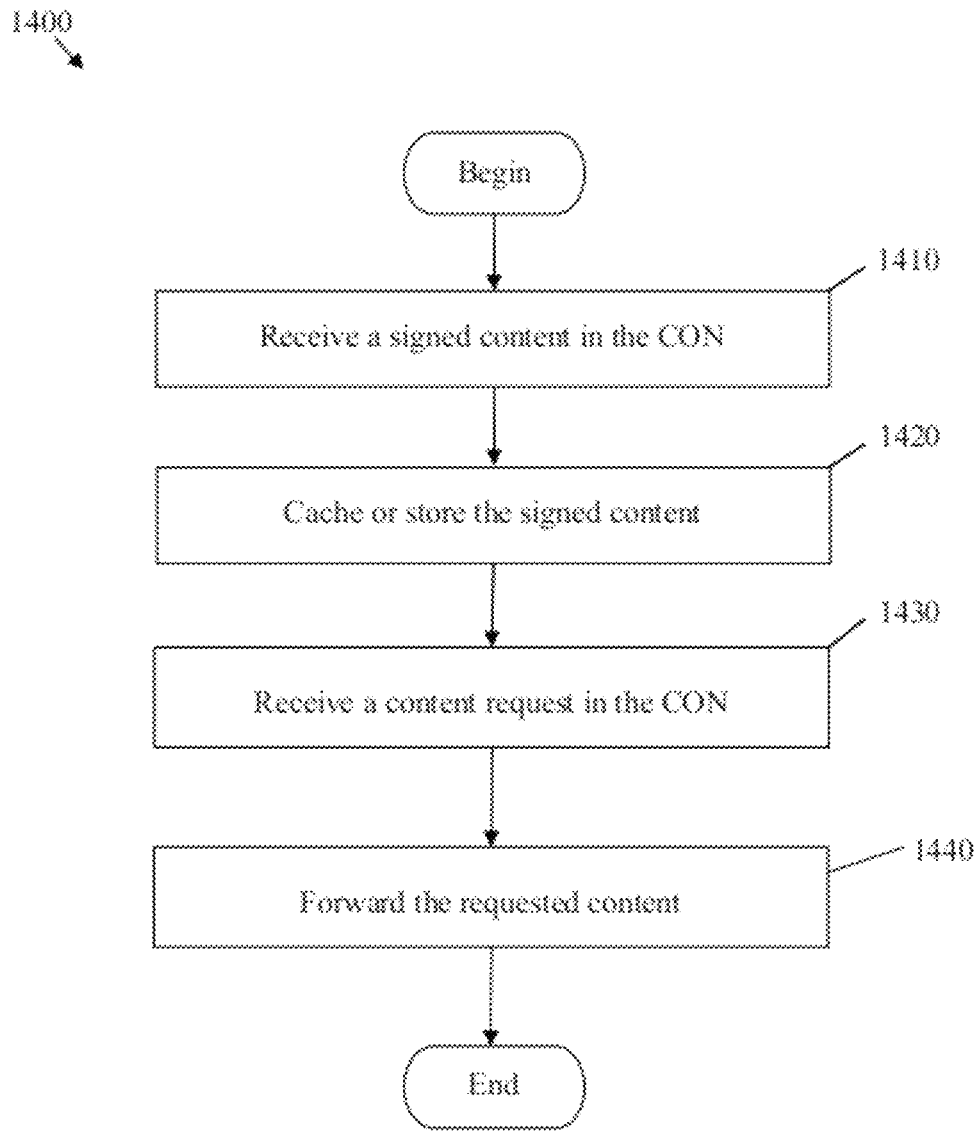
FIG. 14 is a flowchart of an embodiment of a VPG control plane method.

FIG. 14 illustrates an embodiment of a CON security method 1400 that may be used to provide content integrity and confidentiality. The CON security method may be implemented by a CON, a central authority of the CON, one or more content routers, or combinations thereof. The CON security method 1400 may be based on any of the security level schemes described above, e.g., based on a user or user group classification, one of the mode of operations described above, or both. The method 1400 may begin at block 1410, where a signed content may be received in the CON, e.g., by a content router. The received content may be signed and published by a user or publisher. The user or publisher may correspond to one or more user groups and may sign the content using pr-p. The content may be published without ensuring confidentiality by the CON, securely published to ensure confidentiality, or securely published for authorized user groups (using groupid-s).

The CON security 1400 may support one or more VPGs across multiple domains using the notion of exchange points or by extending inter-domain protocols such as External-Border Gateway Protocol (E-BGP) to work across the peering points with appropriate extensions to handle VPG specific information. This also may require appropriate SLA negotiation to meet the requirements of the VPG. The control protocols may be extended to exchange published information from the VPG members across domain boundaries. Thus, the information obtained from another domain may also be associated with certain policies before announcing the information in a local domain. This may allow making content dissemination decisions with the knowledge that VPG instances exists outside the local CON domain. Further, service assurance may also be extended across the peering points by provisioning appropriate bandwidth, storage, and computation resources for VPG traffic crossing the peering points.

The members of a VPG may also be able to access VPG services even when they are mobile. This may not require any special fundamental extensions from the perspective of the constructs that may be used by the CON to enable mobility in a non-VPG scenario. Constructs, schemes, and methods described in U.S. Provisional Patent Application No. 61/439, 769 filed Feb. 4, 2011 by Guo-Qiang Wang et al. and entitled "Method and Apparatus for a Control Plane to Manage Domain-Based Security, Mobility and Social Groups in a Content Oriented Network," which is incorporated herein by reference, may be leveraged to resolve mobile nodes in another domain, and enforce home domain policies in foreign domains. These constructs, schemes, and methods may be combined with per-VPG resource virtualization concepts to provide secured and service assured information dissemination among the mobile members of a VPG.

At block 1420, the signed content may be cached/stored in the CON. The content may be encrypted before caching/storing e.g., by the content router. The content may be encrypted using an encryption key k, a groupid-s, or a policy.

The encrypted content may also be signed using pr-c. At block 1430, a content request may be received in the CON, e.g., by the same or a second content router. The content may be received from a user or subscriber in the same user group or another user group authorized to obtain the content. At block 1440, the requested content may be forwarded. The content router may forward the cached/stored content to the subscriber. If the cached/stored content is encrypted, then the content router my decrypt the content using the encryption key k or groupid-s. The subscriber and optionally the content router may also verify the content before obtaining the content. The method 1400 may then end.

Figure 15:
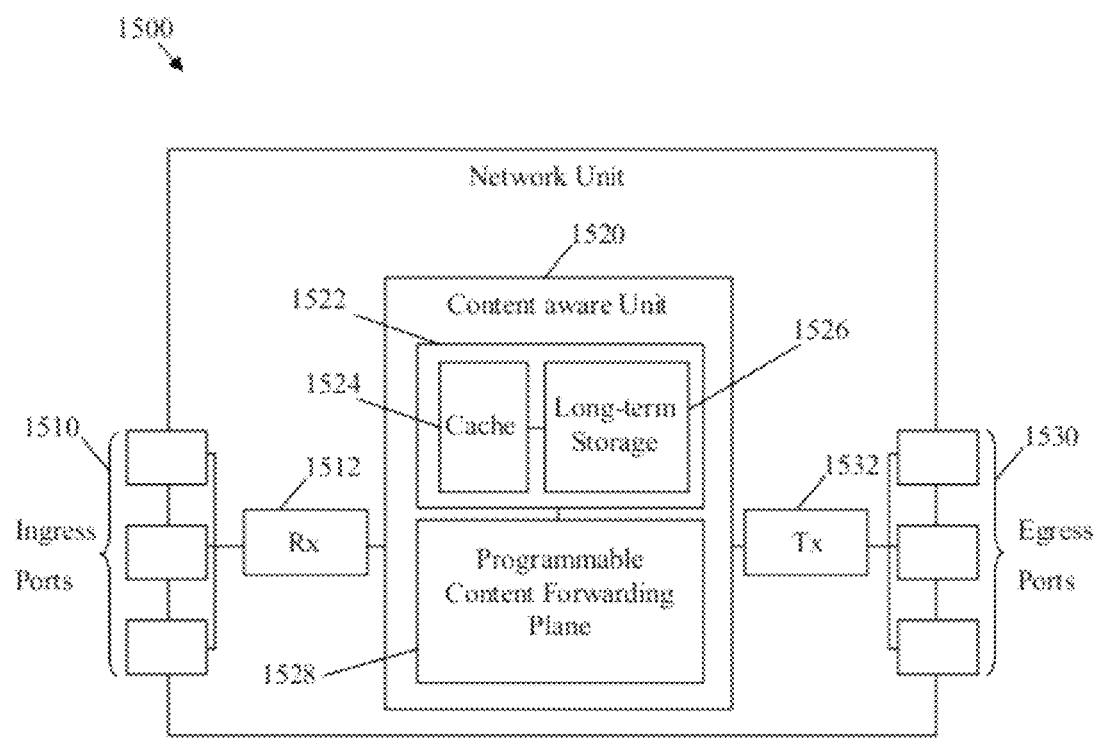
FIG. 15 is a schematic diagram of an embodiment of a transmitter/receiver unit.

FIG. 15 illustrates an embodiment of a network unit 1500, which may be any device that transports and processes data through a network. For instance, the network unit 1500 may be located in the content router or any node in the CON 100, or any node in the CON schemes described above. The content router may also be configured to implement or support the CON security method 1400 described above. The network unit 1500 may comprise one or more ingress ports or units 1510 coupled to a receiver (Rx) 1512 for receiving signals and frames/data from other network components. The network unit 1500 may comprise a content aware unit 1520 to determine which network components to send content to. The content aware unit 1520 may be implemented using hardware, software, or both. The network unit 1500 may also comprise one or more egress ports or units 1530 coupled to a transmitter (Tx) 1532 for transmitting signals and frames/data to the other network components. The receiver 1512, content aware unit 1520, and transmitter 1532 may also be configured to implement at least some of the disclosed methods, which may be based on hardware, software, or both. The components of the network unit 1500 may be arranged as shown in FIG. 15.

The content aware unit 1520 may also comprise a programmable content forwarding plane block 1528 and one or more storage blocks 1522 that may be coupled to the programmable content forwarding plane block 1528. The programmable content forwarding plane block 1528 may be configured to implement content forwarding and processing functions, such as at an application layer or L3, where the content may be forwarded based on content name or prefix and possibly other content related information that maps the content to network traffic. Such mapping information may be maintained in a content table at the content aware unit 1520 or the network unit 1500. The programmable content forwarding plane block 1528 may interpret user requests for content and accordingly fetch content, e.g., based on metadata and/or content name, from the network or other content routers and may store the content, e.g., temporarily, in the storage blocks 1522. The programmable content forwarding plane block 1528 may then forward the cached content to the user. The programmable content forwarding plane block 1528 may be implemented using software, hardware, or both and may operate above the IP layer or L2. The storage blocks 1522 may comprise a cache 1524 for temporarily storing content, such as content that is requested by a subscriber. Additionally, the storage blocks 1522 may comprise a long-term storage 1526 for storing content relatively longer, such as content submitted by a publisher. For instance, the cache 1524 and the long-term storage 1526 may include Dynamic random-access memories (DRAMs), solid-state drives (SSDs), hard disks, or combinations thereof.

Figure 16:
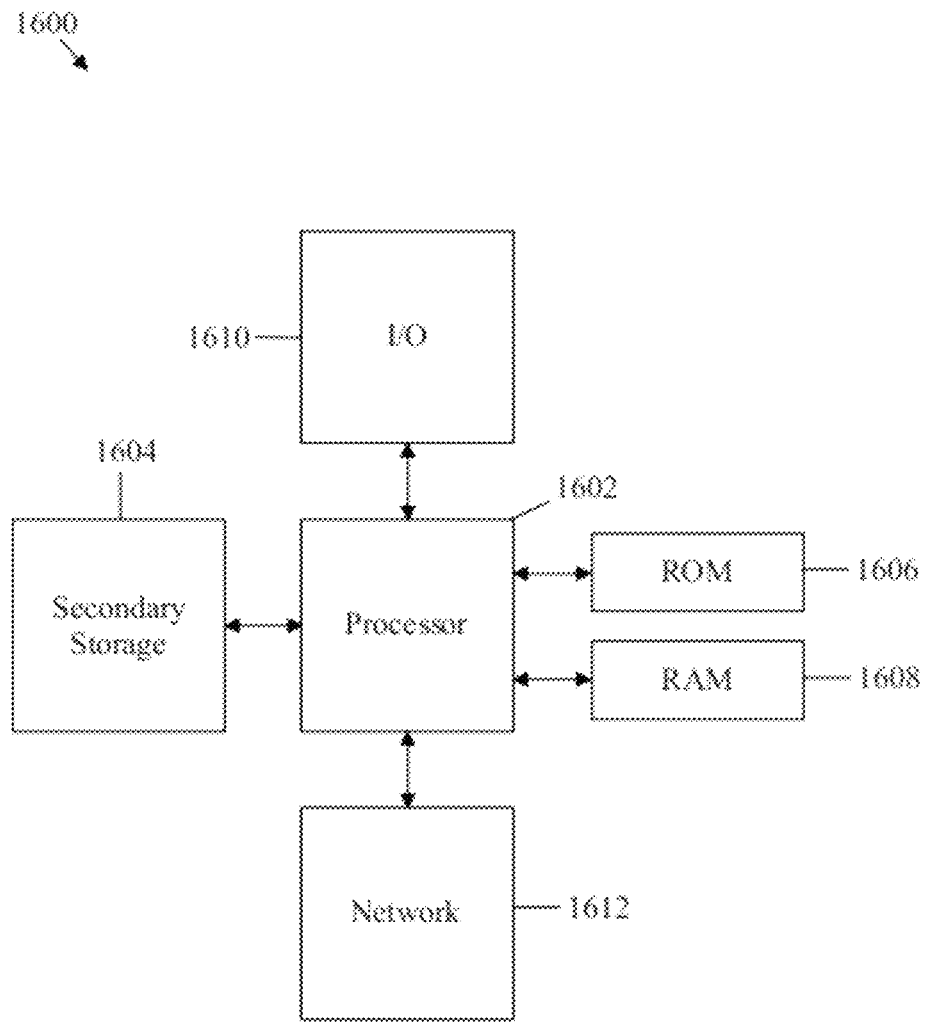
FIG. 16 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 16 illustrates a typical, general-purpose network component 1600 suitable for implementing one or more embodiments of the components disclosed herein. The network component 1600 includes a processor 1602 (which may be referred to as a central processor unit or CPU) that is in communication with memory devices including secondary storage 1604, read only memory (ROM) 1606, random access memory (RAM) 1608, input/output (I/O) devices 1610, and network connectivity devices 1612. The processor 1602 may be implemented as one or more CPU chips, or may be part of one or more application specific integrated circuits (ASICs).

The secondary storage 1604 is typically comprised of one or more disk drives or tape drives and is used for non-volatile storage of data and as an over-flow data storage device if RAM 1608 is not large enough to hold all working data. Secondary storage 1604 may be used to store programs that are loaded into RAM 1608 when such programs are selected for execution. The ROM 1606 is used to store instructions and perhaps data that are read during program execution. ROM 1606 is a non-volatile memory device that typically has a small memory capacity relative to the larger memory capacity of secondary storage 1604. The RAM 1608 is used to store volatile data and perhaps to store instructions. Access to both ROM 1606 and RAM 1608 is typically faster than to secondary storage 1604.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A content router for managing content in a content oriented network (CON), the content router comprising:
   a memory;
   a processor coupled to the memory, wherein the memory contains instructions that when executed by the processor cause the apparatus to:
      instantiate a plurality of virtual private group (VPG) states for a plurality of VPG instances using a VPG content plane and a VPG control plane, wherein instantiation comprises applying at least one VPG management policy to each VPG instance;
      receive via a receiver a content from a VPG producer positioned in the CON and associated with a first of the VPG instances;
      cache in a storage the content from the VPG producer;
      upon receiving a request for the content, via the receiver, forwarding the content to a VPG consumer associated with a second of the VPG instances using a transmitter coupled to the storage;
   wherein the content is signed by the VPG producer, and
   wherein the content router communicates the content between the first VPG instance and the second VPG instance by employing different security levels for each VPG instance.

2. The content router of claim 1, wherein the VPG management policy comprises requirements from a corresponding service level agreement (SLA), or requirements from a Quality of Service (QoS) spanning storage, computing, or bandwidth requirements.

3. The content router of claim 2, wherein the VPG instantiation comprises allocating content router resources based on the requirements of the SLA.

4. The content router of claim 1, wherein the VPG management policy comprises a plurality of corresponding security levels provided by the CON, wherein the security levels comprise a first security level for guaranteeing content integrity, a second security level for guaranteeing content integrity and confidentiality, and a third security level for guaranteeing content integrity, confidentiality, and sharing among multiple authorized VPG customers, and wherein the management policy is applied when the content is replicated and stored.

5. The content router of claim 4, wherein the security levels are implemented based on a plurality of CON operation models, and wherein the CON operation models comprise a first operation model where the CON provides content integrity and the VPG handles content confidentiality, a second operation model where the CON and the VPG share content integrity and confidentiality, and a third operation model where the CON handles both content integrity and confidentiality.

6. The content router of claim 1, wherein instantiating the VPG states further comprises using a VPG storage and computing plane, a VPG transport plane, and a VPG management plane, and wherein the content is cached a plurality of times using a plurality of group identifiers (IDs) for a plurality of VPG instances that are authorized to share the content.

7. The content router of claim 1, wherein the processor is further configured to receive communications from the VPG producer and the VPG consumer via a plurality of application programming interfaces (APIs) for publishing and subscribing content.

8. The content router of claim 1, wherein the storage is local or remote, and wherein the content is cached in the local or remote storage based on storage space constraints.

9. The content router of claim 1, wherein the instructions further cause the processor to:
   assign to a plurality of customers a customer priority ranking; and
   restore services to the customers following a failure based on the customers' customer priority ranking.

10. The content router of claim 1, wherein the instructions further cause the processor to forward a request to apply access policies consistently across a plurality of CON content routers upon receipt of a trigger from a customer to change an access policy.

11. The content router of claim 1, wherein the instructions further cause the processor to receive and forward VPG addressed CON interests, and wherein VPG addresses comprise unique global identifiers.

12. A content oriented network (CON) system comprising:
   a cache component configured to:
      receive a content at a first Virtual Private Group (VPG) state for a first VPG instance, wherein the content is received from a publisher via a first component coupled to the cache component, and wherein the first component is instantiated with a second VPG state for a second VPG instance;
      cache the signed content;
      apply a policy to the content; and
      forward the cached content upon receiving an interest for the content from a customer,
   wherein the content is forwarded to the customer for content verification,
   wherein the content is forwarded via a second component coupled to the cache component,
   wherein the second component is instantiated with a third VPG state for a third VPG instance, and
   wherein the cache component provides different security levels for the customer and the publisher.

13. The CON system of claim 12, wherein the received content is signed by the publisher using a private publisher key, wherein the signed content that is sent from the cache component is sent for verification by the subscriber using a public subscriber key, wherein the signed content is forwarded to a content router for verification using a private content router key, and wherein the signed content is further verified using a public content router key in transit toward the subscriber.

14. The CON system of claim 12, wherein the signed content is encrypted using a logical group policy that indicates a plurality of user groups authorized to share and subscribe the content, and wherein the cached content is decrypted using the group policy before sending the cached content to the subscriber in one of the user groups that satisfies the logical group policy.

15. The CON system of claim 12, wherein the cache component and the first component are comprised within a content router.

16. The CON system of claim 15, wherein the processor is further configured to allocate content router resources based on policy requirements.

17. The CON system of claim 12, wherein the cache component is further configured to:
- assign to a plurality of customers a customer priority ranking; and
- restore services to the customers following a failure based on the customers' customer priority ranking.

18. A method of managing Virtual Private Groups (VPGs) in a content oriented network (CON) comprising:
- receiving, at a device instantiating a first VPG state for a first VPG instance and a second VPG state for a second VPG instance, a first content from a first publisher and a second content from a second publisher, wherein the first content is mapped to the first VPG instance, and wherein the second content is mapped to the second VPG instance;
- processing the first content and the second content, wherein processing comprises:
  - content identification, wherein the first content and the second content are each assigned a unique content identification (ID);
  - VPG tagging, wherein the first content and the second content are each tagged with a VPG ID based on VPG instance;
  - demultiplexing the first content and the second content, wherein the first content and the second content are routed to a corresponding VPG state using filter attributes; and
- storing the first content and the second content in the CON based on the corresponding VPG instance; and
- enforcing a first policy for the first content and enforcing a second policy for the second content, wherein the first policy is different from the second policy.

19. The method of claim 18, wherein the first content has been signed using a signature of the first publisher, wherein the second content has been signed using a signature of the second publisher, wherein one of the first content and the second content is decrypted upon request and sent to a subscriber of the CON for verification of the signature of the one of the first publisher and the second publisher, and wherein the one of the first publisher and the second publisher and the subscriber correspond to one or more organizations that are authorized to share the content based on a policy of the organizations.

20. The method of claim 18, wherein the first content has been signed using a signature of the first publisher, wherein the second content has been signed using a signature of the second publisher, wherein one of the first content and the second content is decrypted upon request and sent to a subscriber of the CON for verification of the signature of the one of the first publisher and the second publisher, wherein the processor is further configured to establish trust with one of the first publisher, the second publisher, and the subscriber, and wherein the first content and the second content is transported over a plurality of secured channels in the CON.

21. The method of claim 18, wherein processing further comprises assigning a first priority ranking to the first publisher and a second priority ranking to the second publisher, wherein the priority ranking indicates an order in which services are restored following a failure.

22. The method of claim 18, wherein a storing comprises using a Distributed Hashed Table (DHT) to index the first content and the second content to ensure isolation between the first VPG state and the second VPG state.

* * * * *